United States Patent
McCoy et al.

(10) Patent No.: US 9,363,577 B2
(45) Date of Patent: *Jun. 7, 2016

(54) SMART LIVE STREAMING EVENT ADS PLAYBACK AND RESUME METHOD

(71) Applicants: Sony Corporation, Tokyo (JP); Sony Network Entertainment International LLC, Los Angeles, CA (US)

(72) Inventors: Charles McCoy, Coronado, CA (US); True Xiong, San Diego, CA (US); Stewart Stremler, San Diego, CA (US)

(73) Assignees: Sony Corporation, Tokyo (JP); Sony Network Entertainment International LLC, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/525,049

(22) Filed: Oct. 27, 2014

(65) Prior Publication Data

US 2015/0113560 A1     Apr. 23, 2015

Related U.S. Application Data

(63) Continuation of application No. 14/015,812, filed on Aug. 30, 2013, now Pat. No. 8,875,175.

(51) Int. Cl.
*H04N 7/10* (2006.01)
*H04N 21/81* (2011.01)
*H04N 21/61* (2011.01)
(Continued)

(52) U.S. Cl.
CPC ....... *H04N 21/812* (2013.01); *H04N 21/44204* (2013.01); *H04N 21/458* (2013.01); *H04N 21/6125* (2013.01); *H04N 21/6543* (2013.01); *H04N 21/6587* (2013.01);
(Continued)

(58) Field of Classification Search
USPC ........... 725/32, 27, 28, 29, 34, 36, 37, 38, 39, 725/40, 42, 43, 44, 46, 47, 48, 49, 51, 67, 725/68, 70, 85, 89, 94, 97, 98, 100, 110, 725/115, 117, 131, 134, 142, 145; 348/14.02, 14.08, 14.11, 385.1, 389.1, 348/432.1, 473, 512, 553, 567, 569, 636, 348/656, 680, 693, 705, 706, 714, 722, 723, 348/725, 729; 370/260, 352, 390; 709/203, 709/204, 219
See application file for complete search history.

(56) References Cited

U.S. PATENT DOCUMENTS 5,818,441 A * 10/1998 Throckmorton et al. ..... 715/717
7,362,349 B2 * 4/2008 Nelson et al. .............. 348/14.08
(Continued)

OTHER PUBLICATIONS

Notice of Allowance from U.S. Appl. No. 14/015,812 mailed Jun. 20, 2014.

*Primary Examiner* — Jefferey Harold
*Assistant Examiner* — Mustafizur Rahman
(74) *Attorney, Agent, or Firm* — Fitch, Even, Tabin & Flannery LLP

(57) ABSTRACT

A digital video viewing system including methods for user selection of video advertisement content and time of display of video advertisements during a live video content stream. The digital video viewing system includes modules for receiving, evaluating and transmitting data within the digital video viewing system and to internet protocol content providers. Also shown are methods for recording and re-playing live internet protocol content in conjunction with the video advertisement display methods.

19 Claims, 14 Drawing Sheets

(51) Int. Cl.

| | |
|---|---|
| *H04N 21/6587* | (2011.01) |
| *H04N 21/442* | (2011.01) |
| *H04N 21/458* | (2011.01) |
| *H04N 21/6543* | (2011.01) |
| H04N 21/643 | (2011.01) |
| H04N 21/2187 | (2011.01) |
| H04N 21/262 | (2011.01) |
| H04N 21/4147 | (2011.01) |

(52) U.S. Cl.
CPC ..... *H04N 21/2187* (2013.01); *H04N 21/26283* (2013.01); *H04N 21/4147* (2013.01); *H04N 21/64322* (2013.01)

(56) References Cited

U.S. PATENT DOCUMENTS

| | | | |
|---|---|---|---|
| 7,716,283 B2 * | 5/2010 | Thukral ........................ 709/204 |
| 8,078,506 B1 * | 12/2011 | Rao et al. ..................... 705/27.2 |
| 8,099,452 B2 | 1/2012 | Chkodrov |
| 8,327,399 B2 * | 12/2012 | Noll et al. ....................... 725/34 |
| 8,418,195 B1 | 4/2013 | Page |
| 8,499,241 B2 * | 7/2013 | Alhadeff et al. ............... 715/719 |
| 8,700,635 B2 * | 4/2014 | Kinouchi et al. .............. 707/746 |
| 2002/0072353 A1 * | 6/2002 | Kim ............................... 455/414 |
| 2004/0008635 A1 * | 1/2004 | Nelson et al. ................. 370/260 |
| 2005/0207355 A1 * | 9/2005 | Du ................................. 370/260 |
| 2006/0282387 A1 * | 12/2006 | Ahmad et al. ................... 705/50 |
| 2007/0027926 A1 * | 2/2007 | Kinouchi et al. ........... 707/104.1 |
| 2008/0049723 A1 * | 2/2008 | Bill et al. ....................... 370/352 |
| 2008/0065722 A1 * | 3/2008 | Brodersen et al. ............ 709/203 |
| 2009/0183199 A1 * | 7/2009 | Stafford et al. .................. 725/34 |
| 2009/0193451 A1 * | 7/2009 | O'Neil ............................. 725/29 |
| 2010/0031288 A1 * | 2/2010 | Scott et al. ...................... 725/38 |
| 2010/0169916 A1 * | 7/2010 | Stettner et al. .................. 725/34 |
| 2010/0184380 A1 * | 7/2010 | Zhou et al. .................... 455/63.1 |
| 2010/0325657 A1 | 12/2010 | Sellers |
| 2011/0023059 A1 | 1/2011 | McCallister |
| 2011/0129199 A1 | 6/2011 | DelSordo |
| 2011/0138429 A1 * | 6/2011 | Schade et al. ................... 725/98 |
| 2012/0117582 A1 * | 5/2012 | Ritter et al. ..................... 725/12 |
| 2012/0230652 A1 | 9/2012 | Mirsky |
| 2013/0016721 A1 * | 1/2013 | Bill et al. ....................... 370/390 |
| 2013/0051693 A1 * | 2/2013 | Ryu et al. ...................... 382/239 |

* cited by examiner

SMART LIVE STREAMING EVENT ADS PLAYBACK AND RESUME METHOD

This application is a continuation of U.S. application Ser. No. 14/015,812, filed Aug. 30, 2013, for SMART LIVE STREAMING EVENT ADS PLAYBACK AND RESUME METHOD, which is incorporated in its entirety herein by reference.

BACKGROUND OF THE INVENTION

1. Field of the Invention

The present invention relates generally to digital video systems, and more specifically to the insertion of video advertisements during viewing of digital video content and recording and replaying of missed digital video content missed due to viewing of video advertisements.

2. Discussion of the Related Art

Internet protocol (IP) video content streaming is becoming increasingly popular and common. Viewers of an internet protocol video viewing device, for example an IP-compatible television or a personal computer, can access unicast or multicast video content streamed from an internet protocol video provider. The video content may be pre-recorded content, such as television series or movie, or may be live content such as a sporting event.

In order to view IP video content, the IP video provider receives a request from the individual viewer's IP video viewing device. The IP video provider then transfers the selected video content in a video stream to the IP video viewing device.

Video advertisements are used to increase revenue for video content providers. The typical broadcast television model includes periods of video content interspersed with shorter time periods of advertisements. The advertisements are the same for all viewers of the regional broadcast. In addition, any live content that occurs during the advertisements is not seen by the viewer, except if the broadcaster choses to replay portions of it. The viewer has no control over when the advertisements are played, the length of an advertisement break or the content of the advertisements played.

With the advent of IP video streaming, more options for insertion of video advertising content exist. One example is similar to the broadcast model, where the ad insertion time, ad length and ad content is determined by the IP video provider. Another option includes a viewer being able to skip an advertisement after viewing the advertisement for a certain length of time. Another option includes selecting of an advertisement by the IP video provider based on available viewer data, thus targeting the viewer.

An increasingly common aspect of video viewing is the ability of some video viewing devices to record video content for playback at a later time. Currently this feature is primarily available to subscribers of cable and satellite programming.

SUMMARY OF THE INVENTION

Several embodiments of the invention provide methods and systems for smart viewing of video advertisements during a live internet protocol video content stream.

In one embodiment, the invention can be characterized as a system for displaying video advertisements during a live internet protocol video content stream comprising an internet protocol video viewing device including: a transmitting module configured for connection to a communication channel, a receiving module configured for connection to the communication channel, wherein an internet protocol video content, an internet protocol ad content, a plurality of ad insertion times and a plurality of ad display durations are received, an evaluation module communicatively coupled to the transmitting module and to the receiving module, and comprising a submodule configured for receiving and evaluating the plurality of ad insertion times and the plurality of ad display durations, a display communicatively coupled to the receiving module and configured to display video content received from the receiving module, and a storage device communicatively coupled to the receiving module.

In a further embodiment, the invention may be characterized as a method for displaying video advertisements during an internet protocol video content stream comprising: receiving of the internet protocol video content stream from a content provider by an internet protocol video viewing device; receiving of an internet protocol ad content from an ad provider by the internet protocol video viewing device; receiving of an internet protocol ad schedule from a schedule provider by the internet protocol video viewing device, wherein the internet protocol ad schedule includes a plurality of ad insertion timecodes and a plurality of ad display durations, wherein each of the plurality of ad insertion timecodes has a corresponding one of the plurality of ad display durations, wherein the each of the plurality of ad insertion timecodes determines start times for ad content display during the viewing of the internet protocol video content stream, and wherein the each of the plurality of ad display durations determines a duration of time of the display of the internet protocol ad content on the internet protocol video viewing device; receiving the internet protocol video content stream on the internet protocol video viewing device; displaying the internet protocol video content stream on the internet protocol video viewing device; pausing the display of the internet protocol video content stream on the internet protocol video viewing device when one of the plurality of ad insertion timecodes is reached; commencing the display of the Internet protocol ad content when the one of the plurality of ad insertion timecodes is reached; ceasing the display of the internet protocol ad content when the one of the plurality of ad display durations corresponding to the one of the plurality of ad insertion timecodes is reached; and resuming display of the Internet protocol video content stream on the Internet protocol video viewing device when the one of the plurality of ad display durations corresponding to the one of the plurality of ad insertion timecodes is reached.

In a further embodiment, the invention may be characterized as method for skipping display of an internet protocol ad content during an internet protocol video content stream comprising receiving of the internet protocol video content stream from a content provider by an Internet protocol video viewing device; receiving of the internet protocol ad content from the content provider by the internet protocol video viewing device; receiving of an internet protocol ad schedule from a schedule provider by the internet protocol video viewing device, wherein the internet protocol ad schedule includes a plurality of ad insertion timecodes and a plurality of ad display durations, wherein each of the plurality of ad insertion timecodes has a corresponding one of the plurality of ad display durations, and wherein each of the plurality of ad insertion timecodes determines the start times for ad content display during the viewing of the internet protocol video content stream, and wherein the each of the plurality of ad display durations determines a duration of time of the display of the internet protocol ad content on the internet protocol video viewing device; receiving the internet protocol video content stream on the internet protocol video viewing device; displaying the internet protocol video content stream on the internet protocol video viewing device; pausing the display of the internet protocol video content stream on the internet protocol video viewing device when one of the plurality of ad insertion timecodes is reached; and commencing the display of the internet protocol ad content when one of the plurality of ad insertion timecodes is reached; providing a user input to the internet protocol video viewing device, wherein the user input includes a skip command, whereby the display of the internet protocol ad content on the internet protocol video viewing device is discontinued; resuming display of the internet protocol video content stream on the internet protocol video viewing device.

In a further embodiment, the invention may be characterized as a method for skipping display of an internet protocol ad content during an internet protocol video content stream comprising: receiving of the internet protocol video content stream from a content provider by an internet protocol video viewing device; receiving of the internet protocol ad content from the content provider by the internet protocol video viewing device, wherein the internet protocol ad content includes a first internet protocol ad and a second internet protocol ad, receiving of an Internet protocol ad schedule from a schedule provider by the Internet protocol video viewing device, wherein the internet protocol ad schedule includes a plurality of ad insertion timecodes and a plurality of ad display durations, wherein each of the plurality of ad insertion timecodes has a corresponding one of the plurality of ad display durations, and wherein the each of the plurality of ad insertion timecodes determines a start time for ad content display during the viewing of the internet protocol video content stream, and wherein the each of the plurality of ad display durations determines a duration of time of the display of the ad content on the internet protocol video viewing device; receiving the internet protocol video content stream on the internet protocol video viewing device; displaying the Internet protocol video content stream on the internet protocol video viewing device; pausing the display of the internet protocol video content stream on the internet protocol video viewing device when one of the plurality of ad insertion timecodes is reached; and commencing the display of the first internet protocol ad when the one of the plurality of ad insertion timecodes is reached; providing a user input to the Internet protocol video viewing device, wherein the user input includes a skip command, whereby the display of the first internet protocol ad on the internet protocol video viewing device is discontinued; and commencing the display of the second internet protocol ad on the internet protocol video viewing device.

In yet another embodiment, the invention may be characterized as a method for determining an advertisement insertion time during an internet protocol video content stream, comprising: providing an internet protocol video viewing device configured for receiving the internet protocol video content stream, displaying the internet protocol video content stream, receiving at least one Internet protocol ad content, displaying internet protocol ad content, switching from display of the internet protocol video content stream to display of the internet protocol ad content, and switching from display of the internet protocol ad content to the display of the internet protocol video content stream; providing a user-input device including means for transmitting data to the internet protocol video viewing device; and displaying the internet protocol video content stream on the internet protocol video viewing device; and inputting an advertisement start datum on the user-input device, wherein the advertisement start datum is transmitted to the internet protocol video viewing device, whereby the display of the internet protocol video content stream is discontinued; and displaying of the internet protocol ad content on the internet protocol video viewing device; and displaying of the internet protocol video content stream on the internet protocol video viewing device when the internet protocol ad content is finished.

In yet another embodiment, the invention may be characterized as a method for displaying an Internet protocol video advertisement during a live Internet protocol video content stream, comprising: providing an internet protocol video viewing device configured for receiving the live internet protocol video content stream through a communication channel, displaying the live internet protocol video content stream, receiving at least one Internet protocol ad content, displaying at least one Internet protocol video advertisement, switching from display of the live internet protocol video content stream to display of the internet protocol video advertisement, switching from display of the internet protocol video advertisement to the display of the live internet protocol video content stream; receiving of the live internet protocol video content stream by the internet protocol video viewing device; displaying the at least one internet protocol ad content on the internet protocol video viewing device during the receiving of the live internet protocol video content stream; recording of the live internet protocol video content stream to a recorded Internet protocol video content when the at least one Internet protocol ad content is displayed on the internet protocol video viewing device; and displaying the recorded internet protocol video content when the internet protocol video advertisement is finished.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
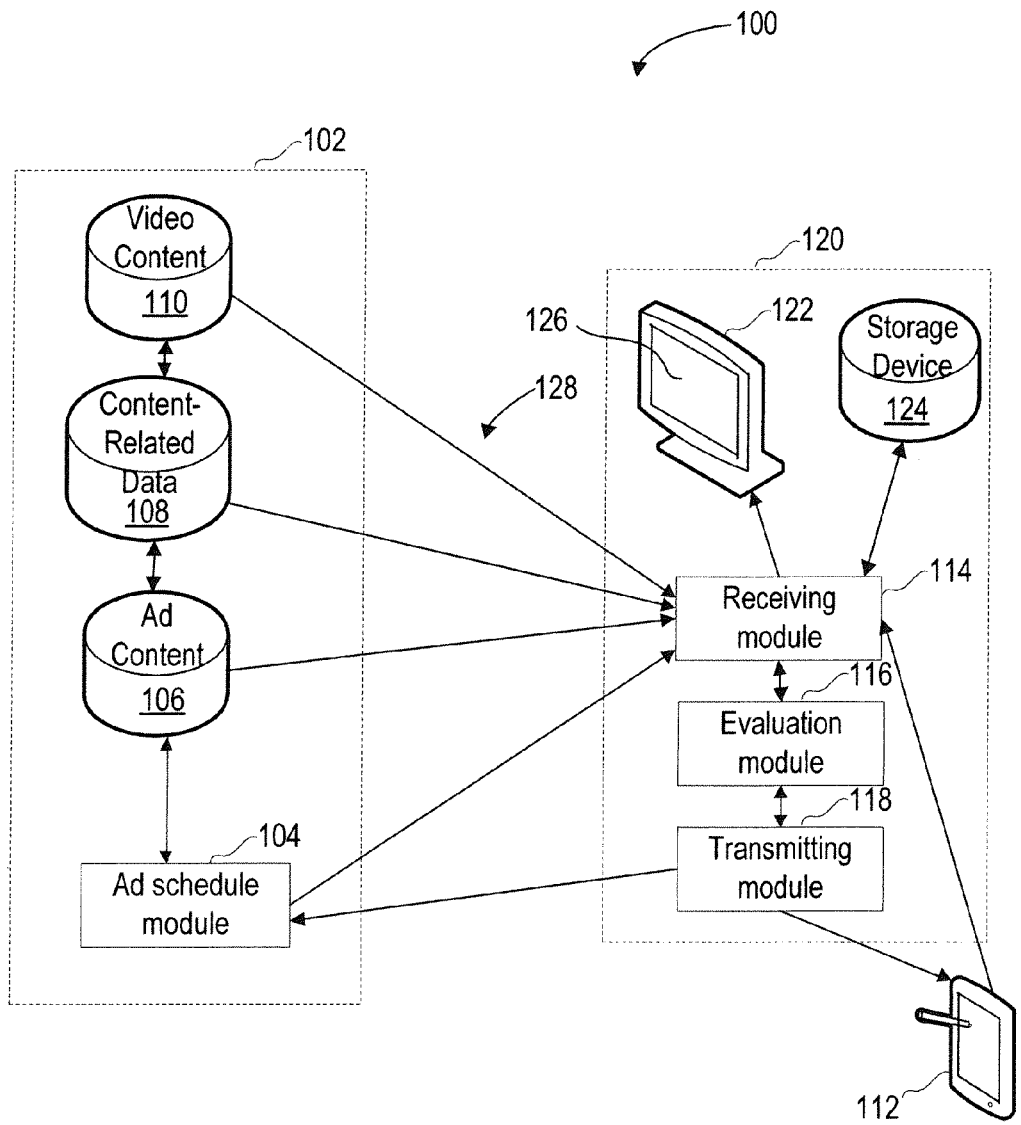
FIG. 1 is a schematic block diagram of a system for viewing smart live streaming with smart ad playback.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Referring first to FIG. 1, shown is a block diagram of a system 100 for viewing smart live streaming with smart ad playback. It should be apparent to those of ordinary skill in the art that the block diagrams shown in FIGS. 1-4 represent general illustrations of embodiments of the present invention, and that other components may be added, or existing components may be removed, rearranged or modified without departing from the scope of the systems shown in FIGS. 1-4.

Shown in FIG. 1 are the digital video viewing system 100, a content and schedule provider 102, an ad schedule module 104, an ad content 106, a content-related data 108, a video content 110, an user input device 112, a receiving module 114, an evaluation module 116, a transmitting module 118, a viewing device 120, a viewing device display 122, a storage device 124, a display screen 126, and a communication channel 128.

The viewing device 120 comprises hardware and software modules for receiving and displaying internet protocol (IP) video content 110. The term "video content" is understood to mean all media types, for example video and audio, associated with a specified media content displayed on a video screen. The viewing device 120 may be any device suitable for receiving and displaying IP video, e.g. internet protocol televisions, tablet computers or smart phones, personal computers, laptop computers, disc players, audio-visual receivers, cable/satellite boxes, network video streaming boxes, and game consoles.

The viewing device 120 comprises the viewing device display 122, the storage device 124, the receiving module 114, the evaluation module 116, and the transmitting module 118.

The receiving module 114 receives data from the video content 110, content-related data 108, the video ads, and the ad schedule module 104. The external data received from the content and schedule provider 102 is transmitted through the communication channel 128. The communication channel 128 is a wired or wireless channel for transferring data between modules. The communication channel 128 may be comprised of a plurality of communication types, for example, wireless communication and internet protocol communication, or Bluetooth, Ethernet and internet protocol communication. The receiving module 114 is communicatively coupled to and receives data from the evaluation module 116 and the storage device 124. The receiving module 114 transmits data to the viewing device display 122, the storage device 124 and the evaluation module 116.

The transmitting module 118 transmits external data to the ad schedule module 104 of the content and schedule provider 102. The external data transmitted to the ad schedule module 104 is transmitted through the communication channel 128. The transmitting module 118 also transmits external data to the user input device 112. The external data transmitted to the user input device 112 may be transmitted through the communication channel 128, or by a separate short-range connection, for example, Bluetooth. The transmitting module 118 is communicatively coupled to the evaluation module 116, and receives data from and transmits data to the evaluation module 116.

As stated above, the evaluation module 116 is communicatively coupled to the receiving module 114 and the transmitting module 118, and receives from and transmits data to both modules.

The viewing device display 122 is communicatively coupled to the receiving module 114 and receives data from the receiving module 114. The viewing device display 122 includes components for displaying the received video and audio data on a screen of the viewing device display 122.

The storage device 124 is communicatively coupled to the receiving module 114. The storage receives data from, and transmits data to, the receiving module 114. The storage device 124 may be any type of suitable data storage device 124, for example a hard drive or flash memory.

The content and schedule provider 102 comprises hardware and software for storing, transmitting and displaying video content 110 and other data associated with streaming video content 110, for example content change files and metadata. The content and schedule provider 102 includes the video content 110, the content-related data 108, the video ads, and the ad schedule module 104.

The video content 110 includes video content data and is configured to communicate content program streams. The video content data may be an MPEG stream or other format suitable for IP streaming. In the embodiment shown, the video content 110 is coupled with and transmits data to the receiving module 114 of the viewing device 120, but the video content 110 may also be transmitted to one or more intermediate devices prior to transmission to the viewing device 120. The video content 110 is transmitted to the receiving module 114 by the IP connection.

The video content 110 may also be in communication with other components of the content and schedule provider 102 through the communication channel 128.

The content-related data 108 includes data related to the video content 110. The data may include content metadata or other data related to the video content 110. In the embodiment shown in FIG. 1, the content-related data 108 is coupled with and transmits data to the receiving module 114 of the viewing device 120, but the content-related data 108 may also be transmitted to one or more intermediate devices prior to transmission to the viewing device 120. The content-related data 108 is transmitted to the receiving module 114 through the communication channel 128.

The content-related data 108 may also be in communication with other components of the content and schedule provider 102 through the communication channel 128.

The ad content 106 includes video advertisement data and is configured to communicate content program streams. The video advertisement data may be an MPEG stream or other format suitable for IP streaming. In the embodiment shown, the ad content 106 is coupled with and transmits data to the receiving module 114 of the viewing device 120, but the ad content 106 may also be transmitted to one or more intermediate devices prior to transmission to the viewing device 120. The ad content 106 is transmitted to the receiving module 114 through the communication channel 128.

The ad content 106 may also be communicatively coupled with other components of the content and schedule provider 102 through the communication channel 128.

The ad schedule module 104 is communicatively coupled to the ad content 106, the content-related data 108, the video content 110, the receiving module 114 and the transmitting module 118. The ad schedule module 104 receives data from the transmitting module 118 via the IP connection. The ad module transmits data to the receiving module 114 through the communication channel 128. The ad schedule module 104 sends and receives data from the internal ad content 106, content-related data 108, and the video content 110 through the communication channel.

The ad schedule module 104 includes components suitable for performing the methods and operations shown in FIGS. 5-14. The components may include a computer processor, executable files, memory, data files and other components necessary to perform logical operations and send instructions to the viewing device 120 to carry out the operations shown in FIGS. 5-14.

Referring again to FIG. 1, the digital video viewing system 100 shown is one embodiment of the system 100 suitable for viewing smart live streaming with smart ad playback methods as shown below in FIGS. 5-14.

The viewing device 120, as shown above, comprises modules for receiving, storing and displaying video content 110, including advertisements, on the screen. The viewing device 120 also includes the evaluation module 116. The evaluation module 116 receives instructions transmitted to the viewing device 120 by the ad schedule module 104, such as ad insertion times 610 and ad display durations 624, as shown below in FIGS. 5-14. The evaluation module 116 also receives and acts on user input, either directly through a remote control, of indirectly through the user input device 112. The user input may comprise trick plays such as replay, or accessing an ad selection menu 934 as shown in FIG. 9. The evaluation module 116 may also transfer data to the transmitting module 118, which then transmits the data to the content and schedule provider 102 for further evaluation.

The ad content 106 transferred to the viewing device 120 may be advertisements chosen by the content and schedule provider 102 based on the video content 110 currently being shown, based on information about the user, or specifically chosen by the user (as shown below in FIGS. 8-10).

The viewing device 120 also receives the content-related data 108 from the content and schedule provider 102. The content-related data 108 may be used to provide additional information about the content video stream that can be used to enhance the video content 110 streamed on the viewing device 120. For example, the content-related data 108 may include timecodes for video highlights of a sporting event (as shown below in FIG. 12)

The content and schedule provider 102 comprises the head-end components for streaming video content to the end user. In the embodiment shown in FIG. 1, the content and schedule provider 102 is shown as a single provider. The content and schedule provider 102 delivers the content to the viewing device 120, in addition to additional data and instructions for displaying the video on the viewing device 120. In addition, the content and schedule provider 102 receives data from the viewing device 120 regarding the actions of the user, which may be incorporated into future instructions sent by the ad schedule module 104 to the viewing device 120.

Figure 2:
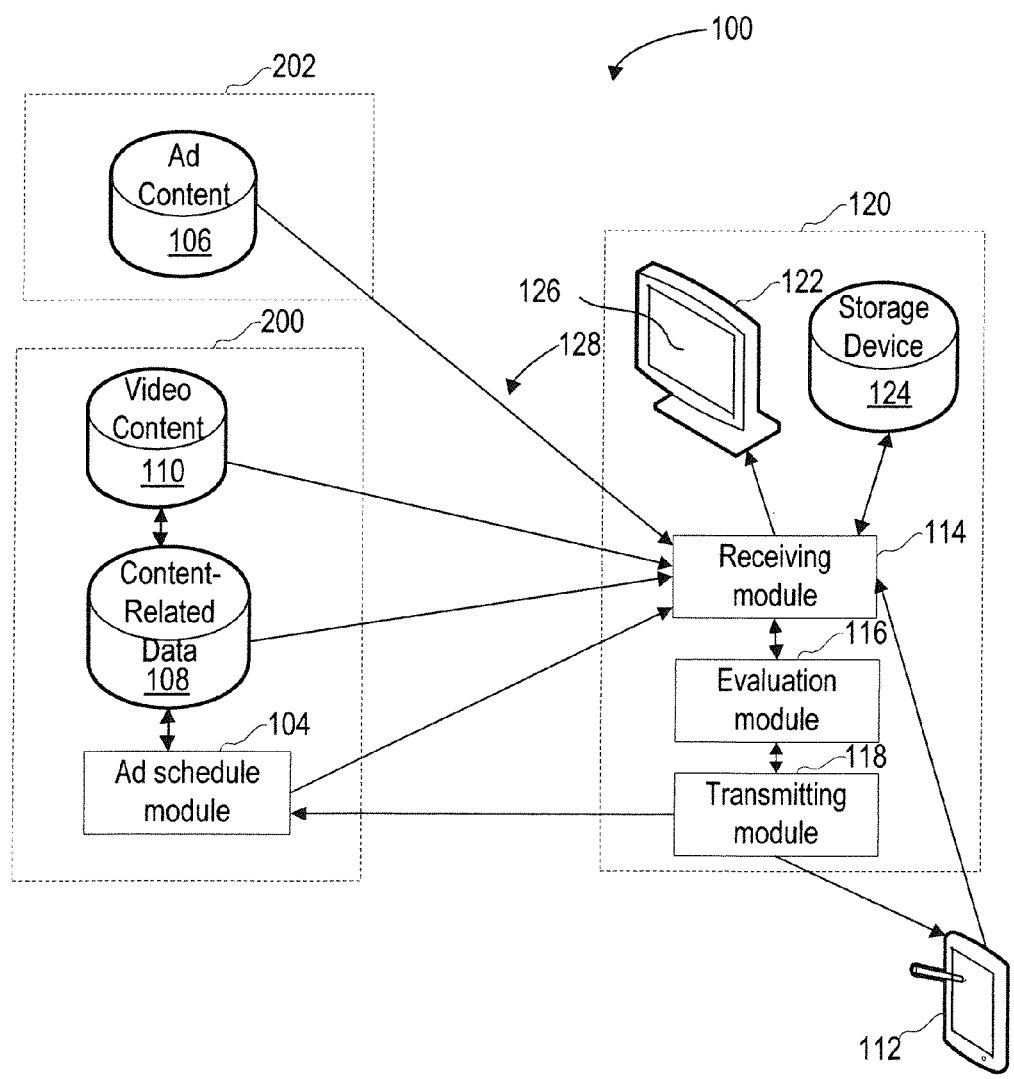
FIG. 2 is a schematic block diagram of a further embodiment system for viewing smart live streaming with smart ad playback.

Referring next to FIG. 2, shown is another embodiment of the system 100 for viewing smart live streaming with smart ad playback. Shown are the digital video viewing system 100, a video content and schedule provider 200, an ad content provider 202, the ad content 106, the ad schedule module 104, the content-related data 108, the video content 110, the user input device 112, the receiving module 114, the evaluation module 116, the transmitting module 118, the viewing device 120, the viewing device display 122, the storage device 124, the display screen 126, the user input device 112, and the communication channel 128.

The system 100 of FIG. 2 operates in the same manner as the system 100 of FIG. 1, with the exception that the ad content 106 is provided through a separate provider than the video content 110. The ad schedule module 104 remains as part of the video content and schedule provider 200.

The separate ad provider allows for ad content 106 to be provided by a server unconnected to the video content and schedule provider 200.

Figure 3:
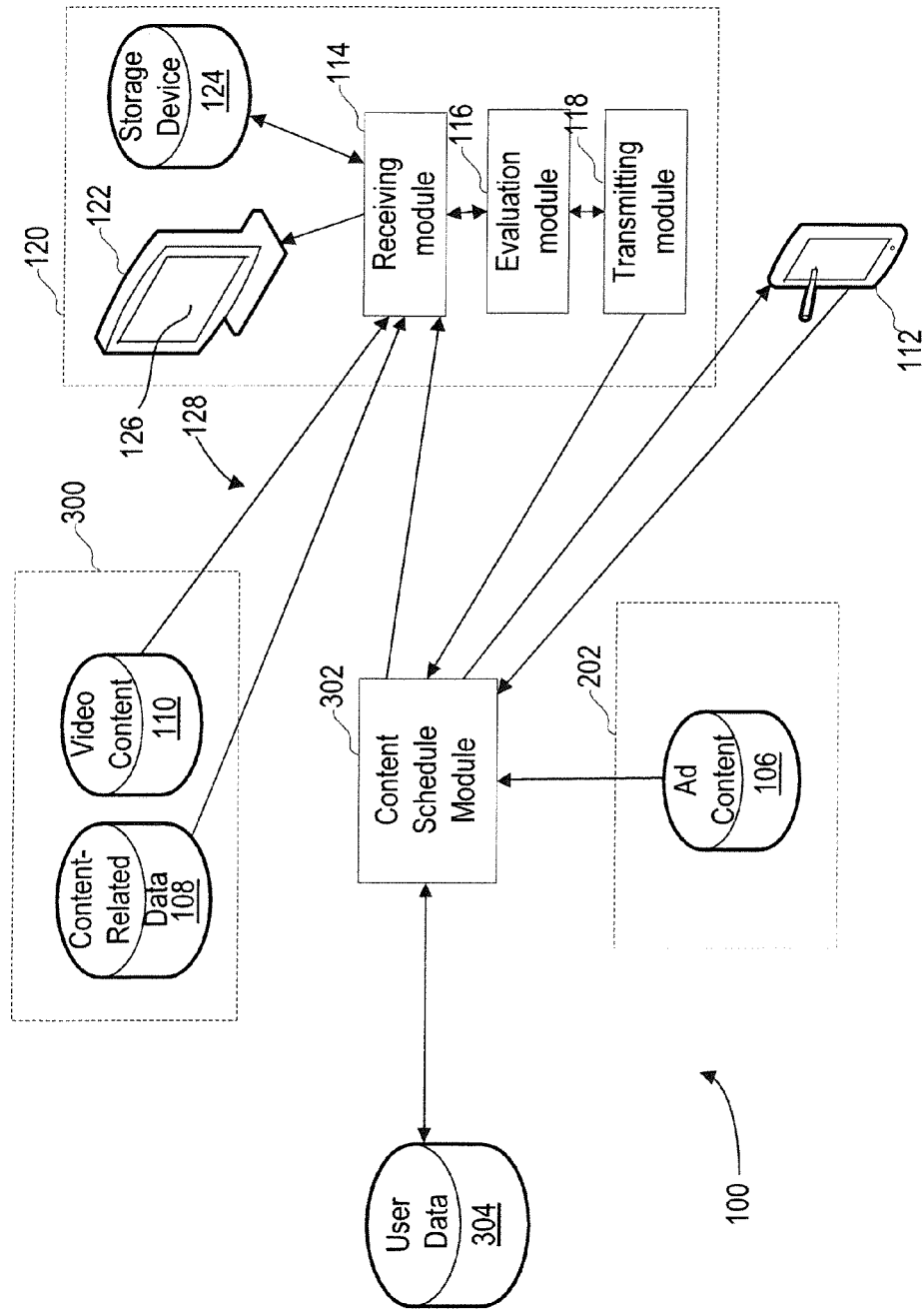
FIG. 3 is a schematic block diagram of a further embodiment system for viewing smart live streaming with smart ad playback.

Referring next to FIG. 3, shown is another embodiment of the system 100 for viewing smart live streaming with smart ad playback. Shown are the digital video viewing system 100, a video provider 300, the ad provider 202, the ad content 106, a content schedule module 302, an user data 304, the video content 110, the content-related data 108, the user input device 112, the receiving module 114, the evaluation module 116, the transmitting module 118, the viewing device 120, the viewing device display 122, the storage device 124, the user input device 112, and the communication channel 128.

In this embodiment of the invention, the head-end components have been separated into four separate providers: the video provider 300, the user data 304, the ad content provider 202 and the content schedule module 302.

The video provider 300 includes the content-related data 108 and the video content 110. The content related data and video content 110 are transmitted directly to the receiving module 114 of the viewing device 120 through the communication channel 128.

The ad provider includes the ad content 106. The ad content 106 is transmitted to the content schedule module 302 through the communication channel 128.

The user data 304 includes data collected about the user, including content watched, ads watched, profile information, and other information collected by the viewing device 120 regarding the user. The user data 304 received data from and transmits data to the content schedule module 302 through the communication channel 128.

The content schedule module 302 receives data from the ad provider, the user data 304, and the viewing device transmitting module 118 through the communication channel 128. The content schedule transmits content and other data to the receiving module 114 of the viewing device 120.

In the embodiment shown in FIG. 3, the user input device 112 communications with the content schedule module 302 through the communication channel 128, instead of communicating directly with the viewing device 120.

This embodiment further allows for the various head-end streaming video components to exist on separate servers communicating through the communication channel 128.

In addition, the user input device 112 communicates directly with the content schedule module 302, allowing for direct communication by the user at the head-end level.

Figure 4:
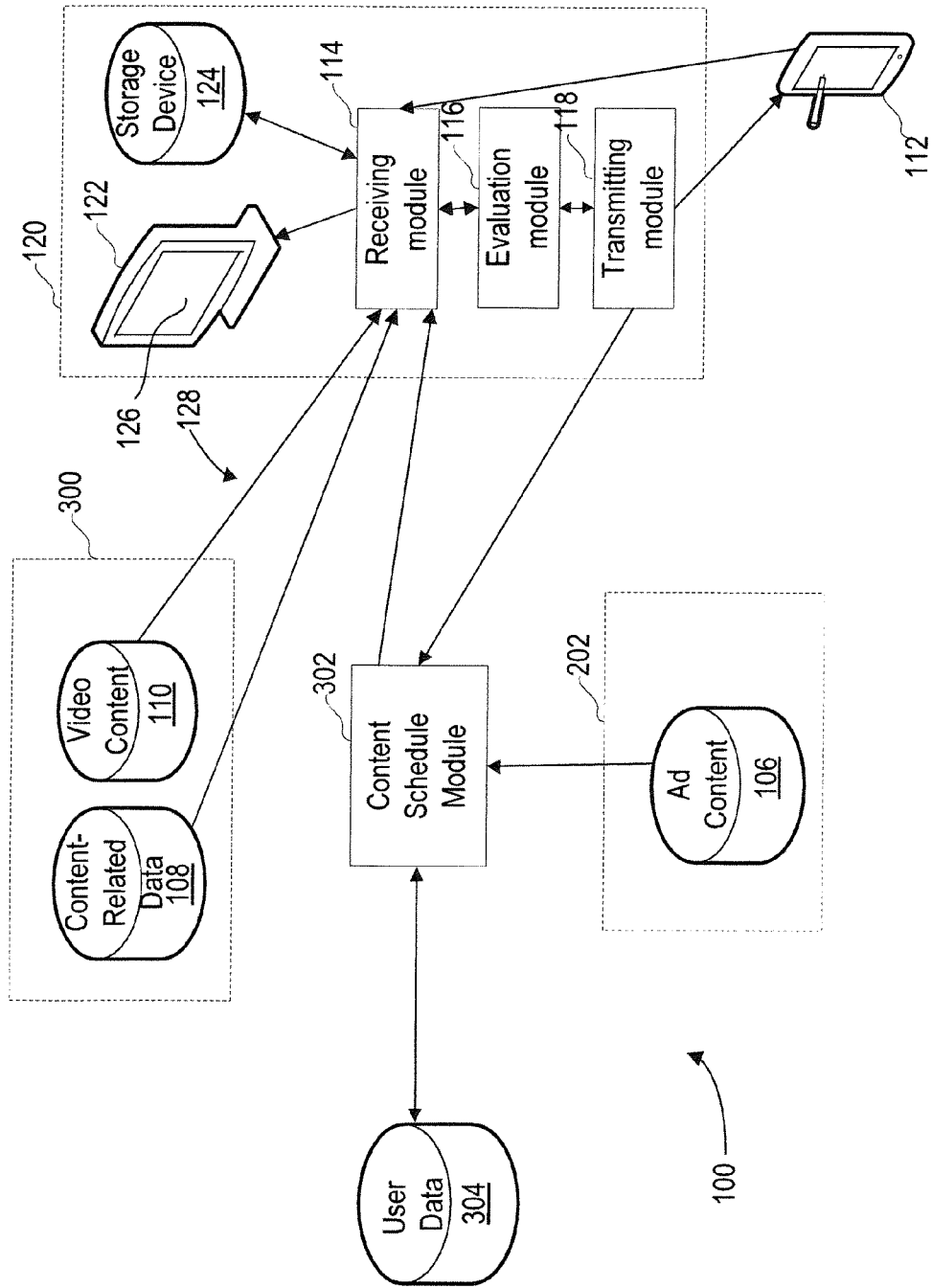
FIG. 4 is a is a schematic block diagram of a further embodiment system for viewing smart live streaming with smart ad playback.

Referring next to FIG. 4, an alternate embodiment of the system 100 for viewing smart live streaming with smart ad playback is shown. Shown are the digital video viewing system 100, the video provider 300, the ad content provider 202, the ad content 106, the content schedule module 302, the user data 304, the video content 110, the content-related data 108, the user input device 112, the receiving module 114, the evaluation module 116, the transmitting module 118, the viewing device 120, the viewing device display 122, the storage device 124, the user input device 112, and the communication channel 128.

The system 100 is similar to the system 100 shown in FIG. 3, but in the embodiment shown the user input device 112 communicates directly with the viewing device 120 instead of the content schedule module 302.

Figure 5:
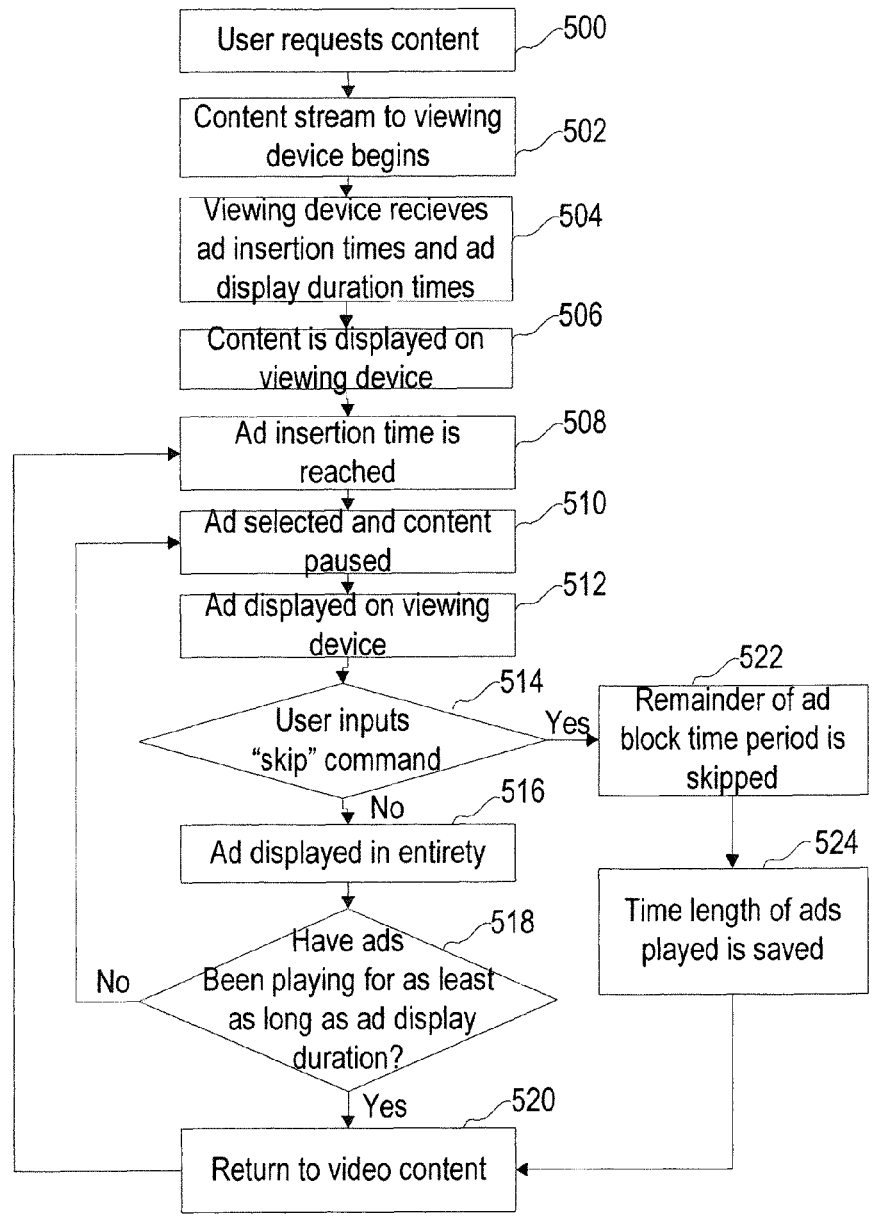
FIG. 5 is a flow chart diagram for a method for video advertisement playback.

Referring next to FIG. 5, a method for video advertisement playback is shown. Shown are a content request step 500, a content transfer step 502, an ad schedule step 504, a play content step 506, an ad insertion time step 508, an ad selection step 510, an ad playback step 512, a skip command decision point step 514, a play entire ad step 516, an ad block time decision point step 518, a resume video content step 520, a skip ad step 522, and a record ad display time step 524.

The advertisement playback method is directed by the evaluation module 116, the ad schedule module 104 or the content schedule module 302. In one embodiment, a computer programming language such as Java, C++, PHP, or Perl may be used to implement the advertisement playback method as shown in FIG. 5.

Firstly, the content request step 500 is shown. The user communicates, either directly to the viewing device 120 or through the user input device 112, a request for video content 110 to be streamed to the viewing device 120. The method then proceeds to the the content transfer step 502.

The following step shown is the content transfer step 502. After the content is requested, the ad schedule module 104 directs the system 100 to transfer the video content 110 to the viewing device 120 through the internet protocol connection. The video content 110 is then displayed on the viewing device 120. The method then proceeds to the ad schedule step 504.

Figure 6:
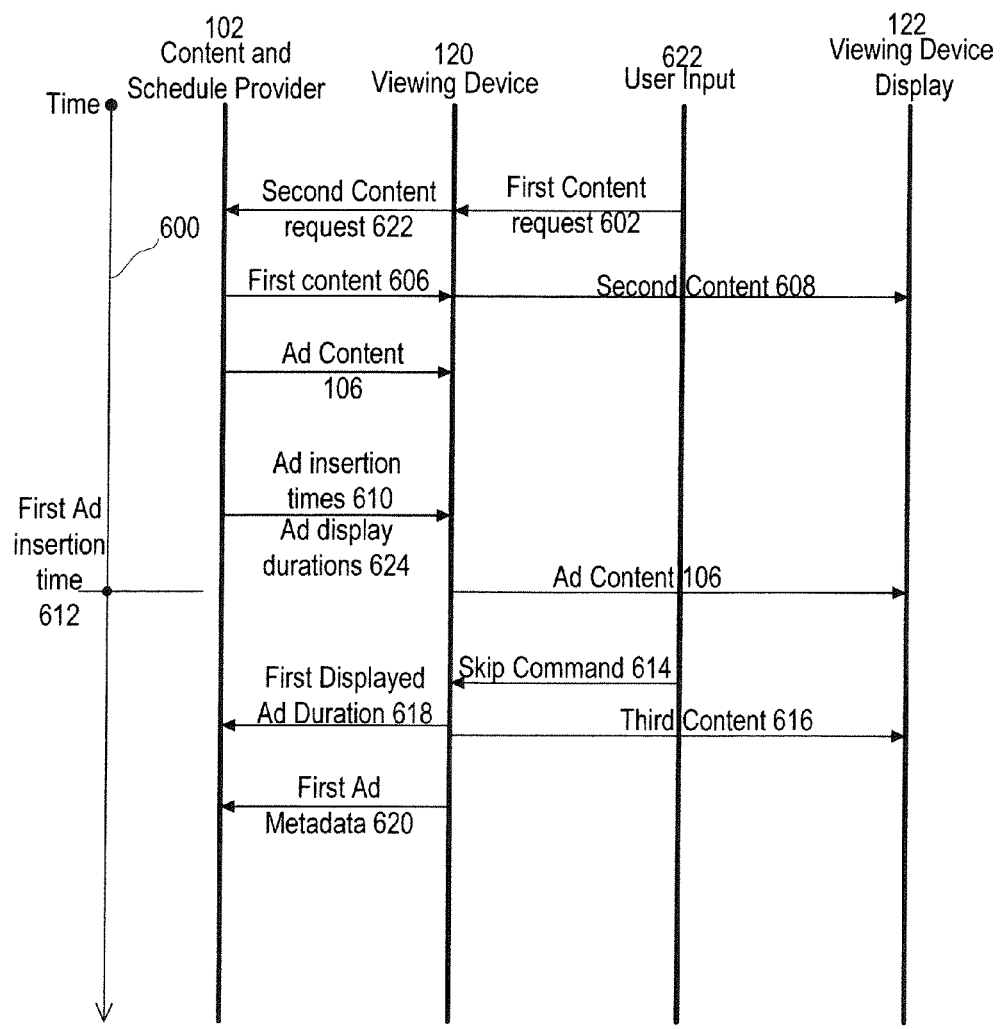
FIG. 6 is a line diagram of an embodiment of video advertisement playback.

The following step is the ad schedule step 504. During the ad schedule step 504, the ad schedule module 104 and the ad content 110 are transferred through internet connection to the viewing device 120, as depicted in FIGS. 1-4. The ad schedule module 104 includes one or more advertisement insertion times 610 and one or more advertisement display durations 624 (as shown in FIG. 6). The ad content 110 is selected using user data 304, content-related data 108 or a combination thereof. The method then proceeds to the play content step 506.

The following step shown is the play content step 506. The video content 110 is played on the viewing device 120. The method then proceeds to the ad insertion time step 508.

The following step shown is the ad insertion time step 508. When one of the advertisement insertion times 610 is reached, the method proceeds to the ad selection step 510.

The next step shown is the ad selection step 510. The ad selection may be determined by the ad schedule module 104 or by user selection as further described below in FIG. 7. It should be noted that alternate methods of ad selection, either at the user end or the head-end of the system 100, will be apparent to those of ordinary skill in the art. The method then proceeds to the ad playback step 512.

The following step shown is the ad playback step 512. During the ad playback step 512, the video content 110 playback is paused and an selected ad content 938 (shown below in FIG. 9) is displayed on the viewing device 120. The method then proceeds to the skip command decision point step 514.

Shown next is the skip command decision point step 514. The user may send a skip command 614 directly to the viewing device 120 or using the user input device 112. If the user does not input the skip command 614 using the user input device 112, the method proceeds to the play entire ad step 516. If the user inputs the skip command 614, the methods proceeds to the skip ad step 522.

The play entire ad step 516 follows from the skip command decision point step 514 if the user does not send the skip command 614 to the viewing device 120 or the user input device 112 while the ad content 110 is displayed on the viewing device display 122. During the play entire ad step 516, a complete video ad is played. The method then proceeds to the ad block time decision point step 518.

The ad block time decision point step 518 follows from the play entire ad step 516. Each ad insertion time 610 has the associated advertisement display duration 624. If, after the ad content 110 is played in its entirely, the advertisement display duration 624 has not been reached, the method returns to the ad selection step 510. If the time of continuous video ad display immediately after the ad insertion time 610 is greater than or equal to the ad display duration 624, the method continues to the resume video content step 520.

The following step is the resume video content step 520. During the resume video content step 520, the advertisement display terminates and the video content 110 display resumes at the point where it was previously paused. The resume video content step 520 then returns to the previous ad insertion time step 508.

Referring back to the skip command decision point step 514, if the user chooses to send the skip command 614 at any time during the ad content display, the ad playback is terminated and the method proceeds to the skip ad step 522. During the skip ad step 522, the remainder of the ad display duration 624 is skipped and the display returns to displaying the video content 110. The method then proceeds to the record ad display time step 524.

The following step shown is the record ad display time step 524. The amount of time the video advertisement is displayed prior to sending of the skip command 614 is saved. The record ad display time step 524 then returns the previous resume video content step 520.

Referring again to FIG. 5, the advertisement playback and control method is used to permit user control of the time and duration of the ad content 110 shown, while still guaranteeing that required video advertisements as determined by advertising contracts are shown.

When the user requests video content 110, as in the content request step 500, the content is downloaded during the following content transfer step 502. The ad schedule module 104 and ad content 110 are downloaded during the ad schedule step 504. The ad schedule module 104 contains the required data and algorithms for scheduling ads within the requested video content 110. The ad schedule module 104 includes one or more ad insertion times 610 and one or more ad display durations 624, with each ad display duration 624 corresponding to the ad insertion time 610. The ad insertion times 610, ad display durations 624 and ad content 110 may be uniquely determined by the ad schedule module 104 or content schedule module 302 using the user data 304 and the content-related data 108. The ad schedule module 104 may contain specific insertion times for certain ads or may access ad content 106 randomly from the downloaded ad content 110.

When enough video content display time has elapsed that a first ad insertion time 612 (as shown below in FIG. 6) is reached in the ad insertion time step 508, the viewing device 120 is directed by the ad schedule module 104 to pause the playback of the video content 110 and play the selected ad content instead (the ad selection step 510 and the ad playback step 512).

The user has the choice to input the skip command 614 during ad playback, as shown in the skip command decision point step 514. For instance, if the viewer is watching a live sporting event, and the ad insertion time 610 occurs during an exciting point in the event, the user may choose to skip the ad playback at that time in order to watch the event.

If the user does not input the skip command 614, the ad content 110 plays in its scheduled entirety (the play entire ad step 516). When the ad content 110 is finished, the ad schedule module 104 determines whether the ad display duration 624 for the ad insertion time 610 has been reached during the ad block time decision point step 518.

If the ad display duration 624 has not been reached in the ad block time decision point step 518, the ad schedule module 104 directs the viewing device 120 to return to the ad selection step 510, select another ad content 106, and then proceed with the method until the ad display duration 624 has been reached.

When the ad display duration 624 has been reached for that ad insertion time 610, the ad schedule module 104 directs the viewing device 120 to resume playback of the video content 110, as shown in the ad block time decision point step 518. The video content 110 then resumes, as shown in the resume video content step 520, until the next ad insertion time 610 (the ad insertion time step 508).

If the user inputs the skip command 614 during ad playback, as shown in the skip command decision point step 514, the remainder of the ad display duration 624 is skipped. The method then proceeds to the record ad display time step 524, where the time length of ads played during the ad display duration 624, prior to the skip command 614, is recorded and communicated to the ad schedule module 104. This allows the ad schedule module 104 to dynamically re-schedule the remaining ad insertion times 610 and ad display durations 624 so as to accommodate the advertising contracts. For example, if an entire ad display duration 624 is skipped, that ad display duration 624 may be added to the ad display duration 624 associated with a subsequent ad insertion time 610, in addition to ad display duration 624 that was originally scheduled for the subsequent ad insertion time 610.

The ad schedule module 104 may prevent skipping of ad display duration 624 if a previously determined number of ad display durations 624 have been skipped.

Referring next to FIG. 6, a line diagram of an embodiment of device communication for content and advertisement display is shown. Shown are a timeline 600, the content and schedule provider 102, the viewing device 120, the viewing device display 122, a user input 622, a first content request 602, a second content request 604, a first content 606, a second content 608, an ad content 106, the ad insertion times 610 and the ad display durations 624, the first ad insertion time 612, the skip command 614, a third content 616, a first displayed ad duration 618 and a first ad metadata 620.

The content and schedule provider 102 and the viewing device 120 shown correspond to those shown in FIG. 1. The viewing devise display 122 shown in FIG. 6 corresponds to the viewing device display 122 as shown in FIG. 1. The user input 622 shown in FIG. 6 corresponds to a direct input to the receiving module 114 of the viewing device 120, for example by a remote control, or to the user input device 112 as shown in FIG. 1. Those skilled in the art will note that the systems of FIG. 2-4 will result in additional embodiments of the invention shown in FIG. 6.

Referring again to FIG. 6, the timeline 600 is shown, indicating the passage of time during which the viewing device 120 is used. In the present embodiment, four components are used to communicate with each other: the content and schedule provider 102, the viewing device 120, the viewing device display 122 and the user input 622. The aforementioned components are each indicated as a line parallel to the timeline 600. Communication between the components is indicated as arrows from one component to another. The arrow indicates the direction of communication.

Initially, the user uses the user input 622 to communicate the first content request 602 to the viewing device 120, as shown by the arrow pointing from the user input device 112 to the viewing device 120. The viewing device 120 then communicates the first content request 602 as the second content request 604 to the content and schedule provider 102, as shown by the arrow pointing from the viewing device 120 to the content and schedule provider 102 at the same time as the first content request 602.

The content and schedule provider 102 then responds to the second content request 604 by communicating the first content 606 to the viewing device 120, as shown by the arrow from the content and schedule provider 102 to the viewing device 120. The viewing device 120 then communicates this content stream to the viewing device display 122 as the second content 608, as indicated by the arrow pointing from the viewing device 120 to the viewing device display 122, at the same time as the first content 606. The second content 608 is displayed on the viewing device display 122.

Simultaneously with the start of the display of the second content 608, or at a slightly later time as shown in FIG. 6, the ad content 106 and the ad insertion times 610 and ad display durations 624 are communicated from the content and schedule provider 102 to the viewing device 120. The ad content 106 communication is indicated by the arrow pointing from the content and schedule provider 102 to the viewing device 120. The ad insertion times 610 and ad display durations 624 communication is indicated by the arrow pointing from the content and schedule provider 102 to the viewing device 120. Those of ordinary skill in the art will note that, while the ad content 106 communication and the ad insertion times 610 and the ad display durations 624 are shown in FIG. 6 as commencing at different times for clarity, they may be communicated to the viewing device 120 simultaneously.

When the first ad insertion time 612 is reached, as shown by the first ad insertion time 612 on the timeline 600 of FIG. 6, the second content 608 is paused and the ad content 106 is communicated from the viewing device 120 to the viewing device display 122, as shown by the ad content 106 arrow pointing from the viewing device 120 to the viewing device display 122.

In the embodiment shown, the user chooses to communicate the skip command 614 at a time after the start of the ad content 106 display. The skip command 614 is indicated by the arrow pointing from the user input device 112 to the viewing device 120.

The viewing device 120 then resumes display of content of the viewing device display 122, as indicated by the third content 616. The third content 616 is shown by an arrow pointing from the viewing device 120 to the viewing device display 122.

After content display is resumed, the viewing device 120 communicates data regarding the ad content 106 display to the content and schedule provider 102. In the present embodiment shown, the viewing device 120 communicates the first displayed ad duration 618 and the first ad metadata 620. The first displayed ad duration 618 is indicated as an arrow pointing from the viewing device 120 to the content and schedule provider 102. The first ad metadata 620 is indicated as an arrow pointing from the viewing device 120 to the content and schedule provider 102.

Those of ordinary skill in the art will note that, while the first displayed ad duration 618 and the first ad metadata 620 are shown in FIG. 6 as commencing at different times for clarity, they may be communicated to the viewing device 120 simultaneously.

The first displayed ad duration 618 includes the length of time the ad content 106 was displayed on the viewing device display 122 prior to the skip command 614. The first ad metadata 620 includes information about the ad that was skipped, for example, the type of ad content 106 that was skipped. The first displayed ad duration 618 and the first ad metadata 620 are used to adjust subsequent ad insertion times 610, ad display durations 624, and selection of ad content 106.

Figure 7:
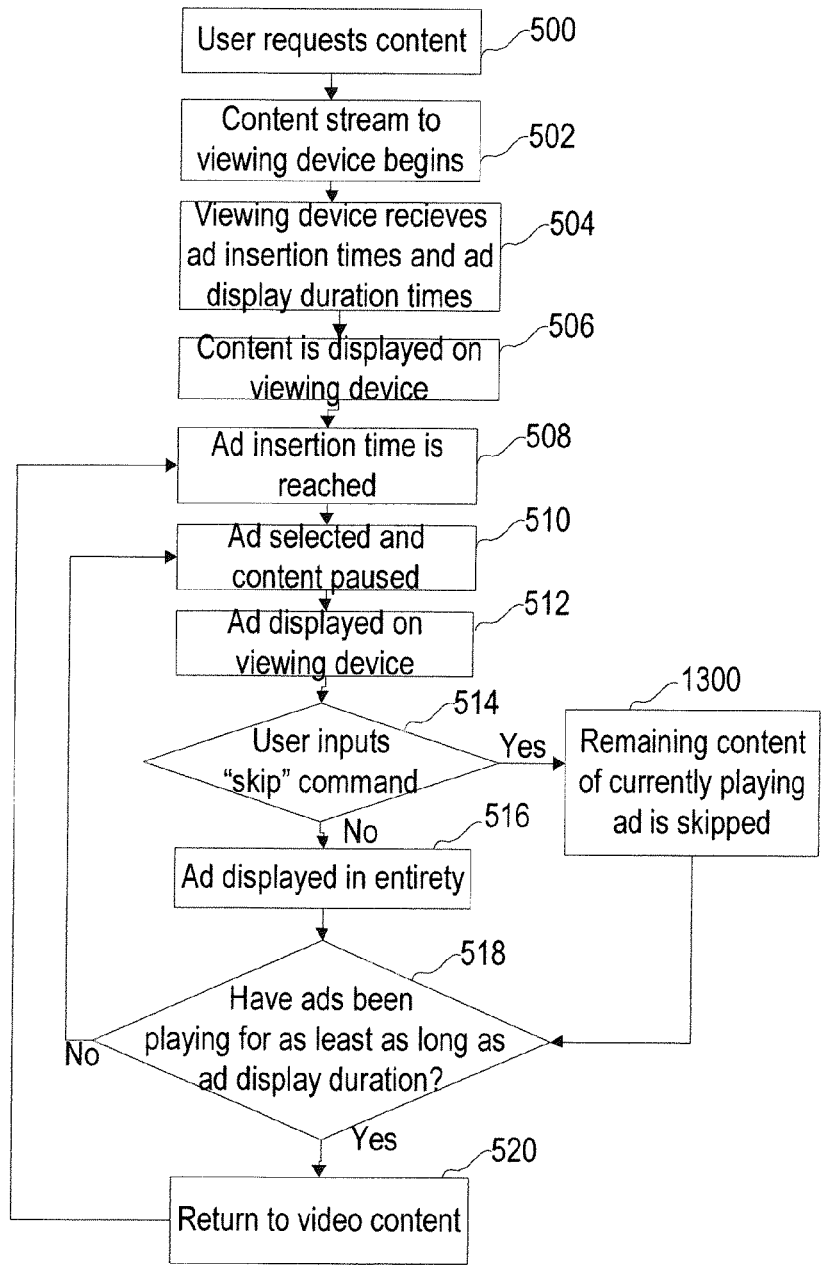
FIG. 7 is a flow chart diagram for a further embodiment of video advertisement playback.

Referring next to FIG. 7, shown is an alternate embodiment of the method for video advertisement playback shown in FIG. 5. Shown are the content request step 500, the content transfer step 502, the ad schedule step 504, the play content step 506, the ad insertion time step 508, the ad selection step 510, the ad playback step 512, the skip command decision point step 514, the play entire ad step 516, the ad block time decision point step 518, the resume video content step 520, and a skip currently playing ad step 1300.

The method for video advertisement as shown in FIG. 7 is identical to the method shown in FIG. 5 until the method reaches the skip command decision point step 514. If, as shown in previously in FIG. 5, the user may send a skip command 614 directly to the viewing device 120 or using the user input device 112. If the user does not input the skip command 614 using the user input device 112, the method proceeds to the play entire ad step 516 and then to subsequent steps as previously shown in FIG. 5.

If the user inputs the skip command 614, the methods proceeds to the skip currently playing ad step 1300. During the skip currently playing ad step 1300, the remainder of the currently playing ad is skipped. The method then continues to the ad block time decision point step 518. If the ad display duration 624 has been reached or exceeded by the length of time of ad display after the ad insertion time has been reached, the method continues to the resume video content step 520, and video content resumes. If the ad display duration 624 has not been reached, the method returns to the ad selection step 510.

Referring again to FIG. 7, the alternate embodiment of the video advertisement playback method allows for the user to skip specific ads, while still allowing for a minimum amount of ad display time. In this embodiment, the user is permitted to skip ads and view alternate ads, giving the user a method of control over the ad content, while still viewing a certain amount of ads as determined by the content and/or schedule providers 102, 200, 302 as previously shown in FIGS. 1-4.

Figure 8:
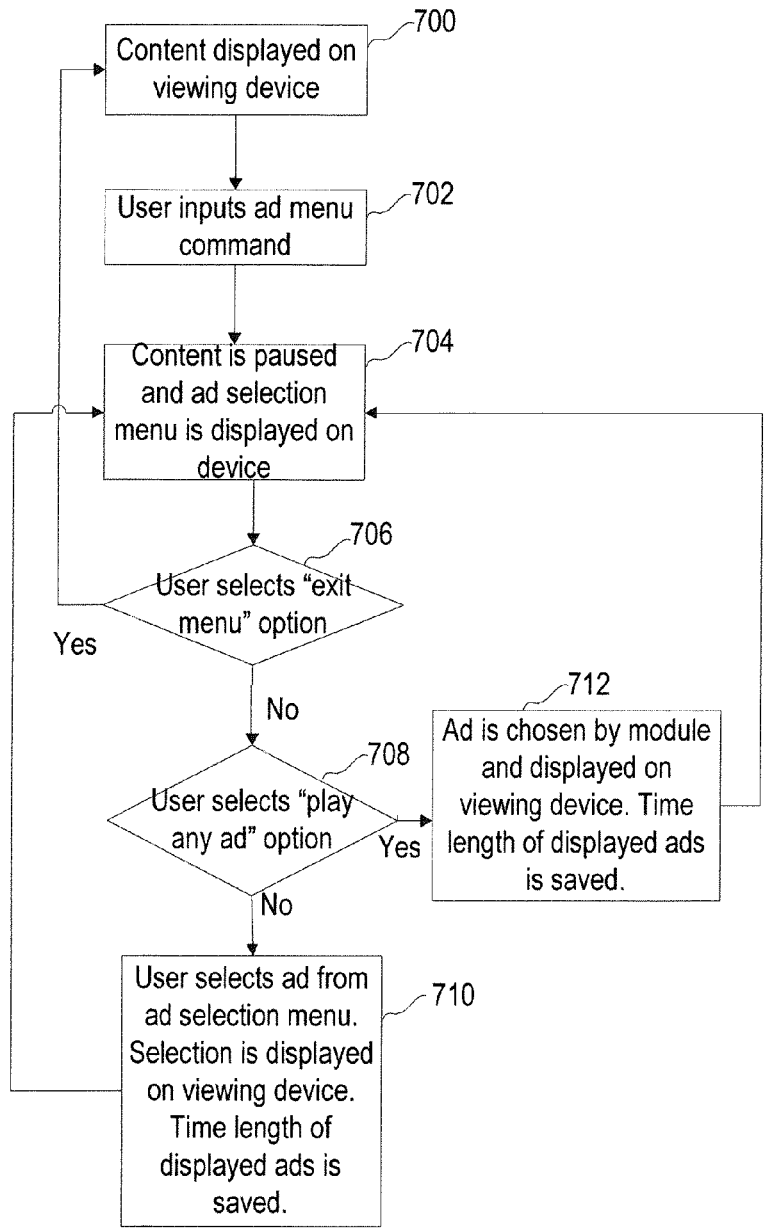
FIG. 8 is a flow chart diagram for a method of video advertisement selection.
Figure 9:
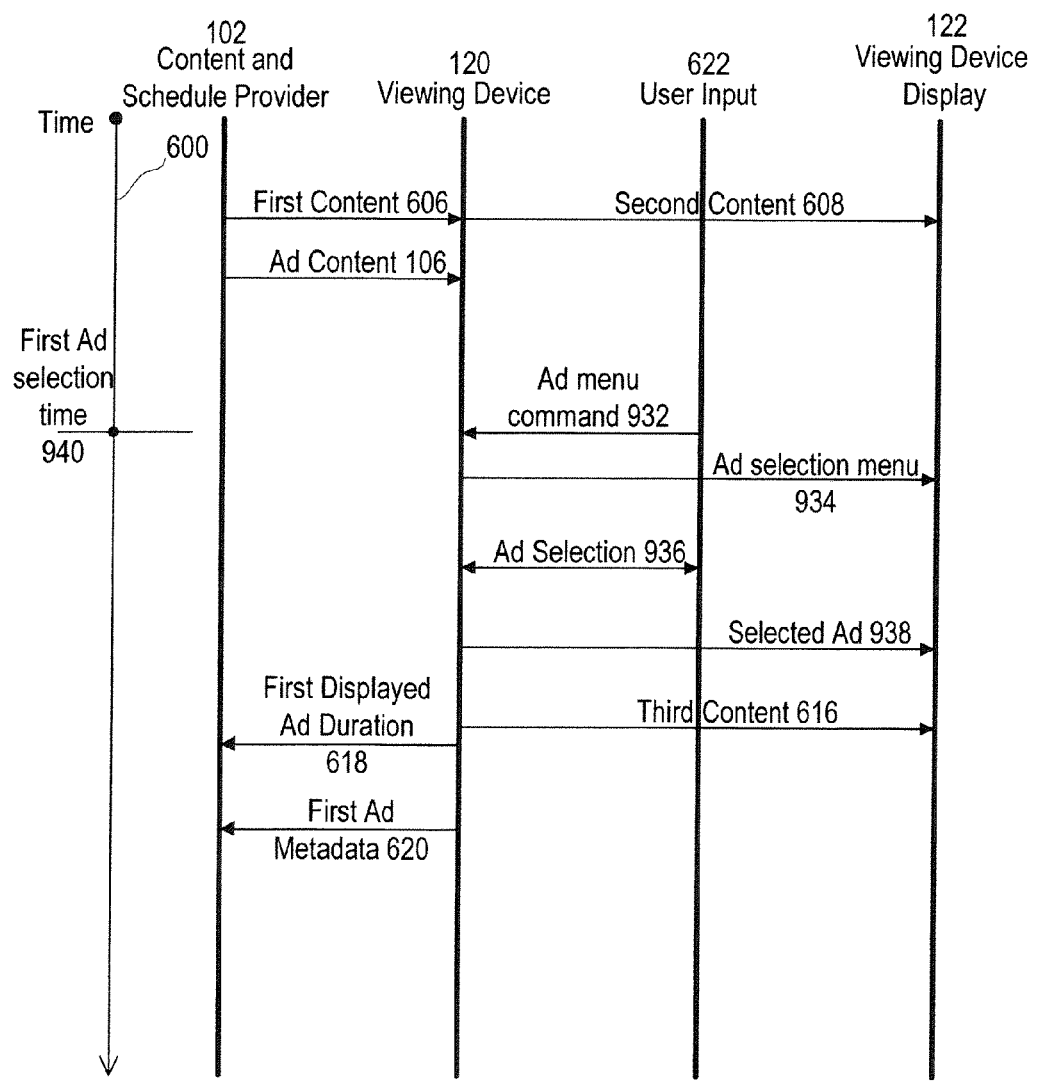
FIG. 9 is a line diagram of an embodiment of device communication for ad selection.

Referring next to FIG. 8, a method for video ad selection is shown. Shown are a displayed video content step 700, an ad selection input step 702, an ad selection display step 704, an exit decision point step 706, a play any ad decision point step 708, a play user-selected ad step 710, and a play non-user-selected ad step 712.

The first step in the video ad selection method shown in FIG. 8 is the displayed video content step 700. During the displayed video content step 700 video content is displayed on the viewing device 120. The displayed video content may be ad content 106 or user-chosen video content 110. The method then proceeds to the ad selection input step 702.

The following step in the video ad selection method is the ad selection input step 702. During the ad selection input step 702, the user inputs a command to the viewing device 120 or to the user input device 112 (as shown in FIGS. 1-4) to display the ad selection menu 934 on the viewing device 120 or the user input device 112. The method then proceeds to the ad selection display step 704.

The ad selection display step 704 follows from the ad selection input step 702. In one embodiment, the ad selection menu 934 is displayed on the device used, i.e. if the ad selection commands are input using the user input device 112, then the ad selection menu 934 is displayed on the communication device. The ad selection menu 934 has a plurality of choosable menu options, including a "play any ad" option. Other menu options may include sub-menus for types of ads, e.g. humorous, dramatic, types of ad products, e.g. cars, cleaning products; or ads for a specific company or brand. The method then proceeds to the exit decision point step 706.

The next step is the exit decision point step 706. During the exit decision point step 706, the user has the option to exit the ad selection menu 934. If the user selects the exit option, the method returns to the displayed video content step 700. If the user does not select the exit ad selection menu option, the method continues to the play any ad decision point step 708.

The following step in the video ad selection method is the play any ad decision point step 708. If the user selects the "play any ad" option, the method proceeds to step play non-user-selected ad step 712. If the user does not select the "play any ad" option, the method proceeds to the play user-selected ad step 710.

The play non-user-selected ad step 712 proceeds from the play any ad decision point step 708. During the play non-user-selected ad step 712, the advertisement displayed is selected from the ads previously transferred to the viewing device 120. The ad is selected randomly or determined by user data 304. Once the ad has been played, the method returns to the ad selection display step 704.

The play user-selected ad step 710 follows from the pay any ad decision point step 708. During the play user-selected ad step 710 the user negotiates the ad selection menu 934 and selects a type of ads or a specific ad. The viewing device 120 then displays the selected ad 938 (as shown below in FIG. 9) on the viewing device display 122. The method then returns to the ad selection display step 704.

Referring again to FIG. 8, the video ad selection method is used to provide user selection for both the time of play of the ad and content of the ad.

Initially, video content is played on the viewing device 120. The video content may be either content 110 chosen by the user, for example a live sporting event, or may be ad content 106 with time of play and content determined by the ad schedule module 104. If the user has previously chosen to skip previously scheduled ads, for example, because the ad insertion time 610 was during an exciting part of the sporting event, the user may choose a later time to watch the ads as necessary to fulfill content provider advertising contracts. Also, if a user is watching an ad chosen by the ad schedule module 104, the user may choose to select a different ad to view.

Following the ad selection input step 702, the user inputs a command to view a graphical user selection menu (not shown) either on the viewing device 120 or the user input device 112. The user selection menu is used to select the ad to be played. The use of user input to select the ad is one example of using an ad selection criteria (not shown) to select the ad. Other methods and sources of ad selection criteria may also be used, for example, as shown below in the play non-user-selected ad step 712.

Following the ad selection input step 702, the ad selection menu 934 is displayed on the screen used to make the selection, i.e. the viewing device 120 or the user input device 112. If the user input device 112 is used to make the ad selection, in one embodiment playback of content 110 continues on the viewing device 120 while the ad selection is made.

The ad selection menu 934 includes an option to exit the menu. If the user exits the menu in the exit decision point step 706, the method returns the display to the previous device display (displayed video content step 700).

If the user does not exit the menu, the user may chose the "play any ad" option from the ad selection menu 934. The "play any ad" option would be used when the user choses the time that advertisements are played, but does not want to determine the content of the ads.

If the user selects the "play any ad" option, the method proceeds to the play non-user-selected ad step 712, where the ad is chosen by the user, ad schedule module 104, or other automatic means.

If the user does not select the "play any ad" option, the user selects an ad from among the menu options shown on the ad selection menu 934, as shown in the user ad selection step 510. It will be apparent to those of ordinary skill in the art that many possible menu configurations exist, and will be determined by factors including user data 304, user interface of the viewing device 120 or user input device 112, content-related data 108 and ad content 106. In some embodiments the user will have options to make more specific choices, such as a specific ad, or more general choices, such as any ad with the tag "humorous." If the user makes a more general choice, the ad schedule module 104 or the viewing device 120 will make a selection from the group of ads selected based on available criteria.

After the ad is selected, as detailed above, the selected ad 938 is played on the viewing device 120. The viewing device 120 records the ad time watched and sends it to the ad schedule module 104, which re-schedules ad blocks and ad insertion times based on the amount of time the ad was displayed and the ad content 106.

When the user-selected ad 938 is finished, the method returns to the ad selection menu, whereby the user may display more ads or exit to content.

Referring next to FIG. 9, a line diagram of an embodiment of device communication for ad selection is shown. Shown are a timeline 600, the content and schedule provider 102, the viewing device 120, the viewing device display 122, the user input device 112, the first content 606, the second content 608, an ad content 106, the first ad selection time 940, an ad menu command 932, an ad selection 936, the ad selection menu 934, a third content 616, a selected ad 938, a first displayed ad duration 618, and an first ad metadata 620.

The content and schedule provider 102 and the viewing device 120 shown correspond to those shown in FIG. 1. The viewing device display 122 shown in FIG. 9 corresponds to the viewing devise display 122 as shown in FIG. 1. The user input 622 shown in FIG. 7 corresponds to a direct input to the receiving module 114 of the viewing device 120, for example by a remote control, or to the user input device 112 as shown in FIG. 1. Those skilled in the art will note that the systems of FIG. 2-4 will result in additional embodiments of the invention shown in FIG. 9.

Referring again to FIG. 9, the timeline 600 is shown, indicating the passage of time during which the viewing device 120 is used. In the present embodiment, four components are used to communicate with each other: the content and schedule provider 102, the viewing device 120, the viewing device display 122 and the user input 622. The aforementioned components are each indicated as a line parallel to the timeline 600. Communication between the components is indicated as arrows from one component to another. The arrow indicates the direction of communication.

Initially, the user uses the user input 622 to communicate the content request, as previously shown in FIG. 6 (not shown in FIG. 8). As shown in FIG. 9, the resulting first content 606 is communicated from the content and schedule provider 102 to the viewing device 120, as shown by the first content 606 arrow pointing from the content and schedule provider 102 to the viewing device 120. The first content 606 stream is then communicated from the viewing device 120 to the viewing device display 122 as the second content 608 stream, as indicated by the second arrow pointing from the viewing device 120 to the viewing device display 122.

Simultaneously with the start of the first content 606 stream, or at a slightly later time as shown in FIG. 9, the ad content 106 and the ad insertion times 610 and ad display durations 624 are communicated from the content and schedule provider 102 to the viewing device 120. The ad content 106 communication is indicated by the arrow pointing from the content and schedule provider 102 to the viewing device 120.

At some later time during the content display, as indicated by the first ad selection time 940 on the timeline 600, the user input 622 communicates with the viewing device 120. The communication includes a command for the viewing device 120 to display the ad selection menu 934 on the viewing device display 122. This is indicated by the ad menu command 932 arrow pointing from the user input device 112 to the viewing device 120. The ad selection menu 934 arrow from the viewing device 120 to the viewing device display 122 indicates the pausing of the second content 608 and display of the ad selection menu 934 on the viewing device display 122.

As shown previously in FIG. 8, the user may choose to watch an ad selected by the viewing device 120 or may select a specific ad. The ad selection process is indicated by the ad selection 936 arrow. As the ad selection 936 in some embodiments includes communication from the viewing device 120 to the user input device 112, as well as communication from the user input device 112 to the viewing device 120, the ad selection 936 is shown with arrowheads on both ends.

After the ad is selected as previously shown in FIG. 8, the selected ad 938 is communicated from the viewing device 120 to the viewing device display 122, as indicated by the selected ad 938 arrow pointing from the viewing device 120 to the viewing device display 122.

When the selected ad 938, or ads, has ended, the content resumes, as shown by the third content 616. The third content 616 is indicated by the third content 616 arrow pointing from the viewing device 120 to the viewing device display 122.

After content is resumed, the viewing device 120 communicates data regarding the ad content 106 display to the content and schedule provider 102. In the present embodiment shown, the viewing device 120 communicates the first displayed ad duration 618 and the first ad metadata 620. The first displayed ad duration 618 is indicated as the first displayed ad duration 618 arrow pointing from the viewing device 120 to the content and schedule provider 102. The first ad metadata 620 is indicated as the first ad metadata 620 arrow pointing from the viewing device 120 to the content and schedule provider 102.

Those of ordinary skill in the art will note that, while the first displayed ad duration 618 arrow and the first ad metadata 620 arrow are shown in FIG. 9 as commencing at different times for clarity, they may be communicated to the viewing device 120 simultaneously.

The first displayed ad duration 618 includes the length of time the selected ad 938 was displayed on the viewing device display 122. The first ad metadata 620 includes information about the selected ad 938, for example, the type of ad content 106 that was skipped. The first displayed ad duration 618 and the first ad metadata 620 are used to adjust subsequent ad insertion times 610, ad display durations 624, and selection of ad content 106.

Figure 10:
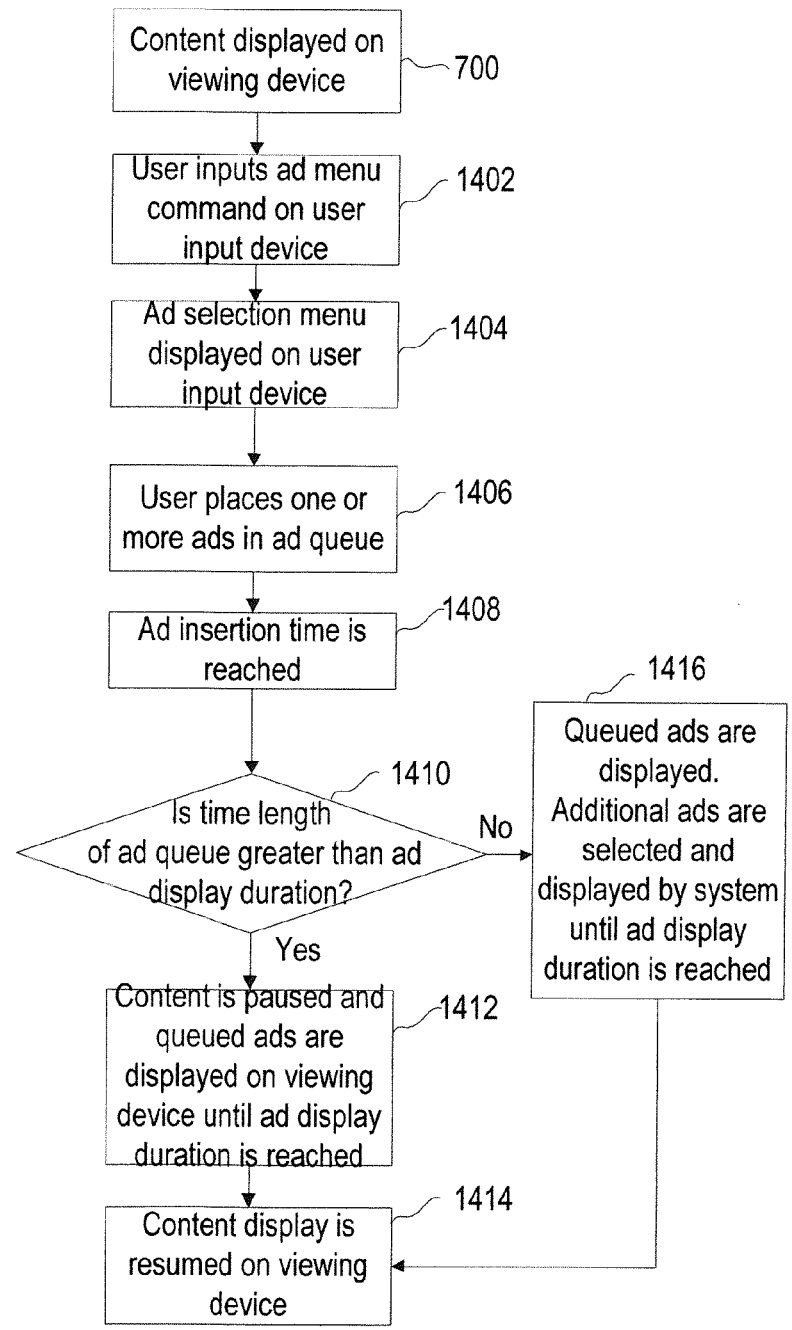
FIG. 10 is a flow chart diagram for a further embodiment of video advertisement selection.

Referring next to FIG. 10, an alternate method for video ad selection is shown. Shown are the displayed video content step 700, a user input device menu command step 1402, a user input device menu display step 1304, and ad selection step 1406, a reach ad insertion time step 1408, an ad queue decision point step 1410, a display queued ad step 1412, and a resume content display step 1414, and a display additional ads step 1416.

The first step in the video ad selection method shown in FIG. 10 is the displayed video content step 700, as previously shown in FIG. 8. During the displayed video content step 700, video content is displayed on the viewing device 120. The displayed video content may be ad content 106 or user-chosen video content 110. The method then proceeds to the user input device menu command step 1402.

During the user input device menu command step 1402, the user inputs a command to the user input device 112 to display the ad selection menu 934 on the user input device. The method then proceeds to the user input device menu display step 1404.

The user input device menu display step 1404 follows from the user input device menu command step 1402. The ad selection menu 934 is as previously described in FIG. 9. The method then proceeds to the ad selection step 1406.

During the ad selection step 1406, the user navigates the ad selection menu 934 to select one or more ads to add to an ad queue (not shown). The user may also change the order of ads in queue or delete ads from the ad queue. The ad queue may be stored locally as part of the viewing device 120, or may be transmitted to the content and/or schedule provider 102, 200, 202, 302. The method then proceeds to the ad insertion time step 1408.

At the ad insertion time step 1408, the ad insertion time 610 is reached during the content display. The method then proceeds to the ad queue decision point step 1410.

During the ad queue decision point step 1410, the system 100 determines whether the total time length of ads in the ad queue is sufficient to fill the entire ad display duration 624 associated with the current ad insertion time 610. If the total time length of ads in the ad queue is greater than the ad display duration 624, the method proceeds to the display queued ads step 1412. If there are no ads in the ad queue (total time length of queued ads equal to zero) or the total time length of queued ads is insufficient to fill the ad display duration 624, the method proceeds to the display additional ads step 1416.

The display queued ads step 1412 follows from the ad queue decision point step 1410. During the display queued ads step 1412, the content display is paused on the display screen 126 and at least one of the ads in the ad queue are displayed on the display screen 126. The ads are displayed on the display screen 126 in the order as selected during the ad selection step 1406. The ads are displayed until the ad display duration 624 associated with the ad insertion time 610 has been reached or exceeded by the time length of ads displayed. Those skilled in the art will note that if the ad display duration length exceeds the total length of ads placed in the ad queue, the viewing device 120 may display additional ads as transmitted from the ad content 101. Once the ad display duration 624 has been reached, the method proceeds to the resume content display step 1414.

During the resume content display step 1414, the original content display on the display screen 126 is resumed.

The display additional ads step 1416 follows from the ad queue decision point step 1410. When the total time length of ads in the ad queue is less than the ad display duration, the queued ads, if any, are displayed. After the queued ads have been played, the system 100 selects additional ads from the available content and displays them on the display screen 126 until the ad display duration 624 has been reached.

The additional ads may be selected using various criteria and available data, for example, saved user ad category preferences, type of video content, the user profile, and other metadata. Skilled artisans will note that various modules and components of the systems 100 shown in FIGS. 1-4 may be used to select the additional ads.

Referring again to FIG. 10, an alternate method for video ad selection is shown. This method differs from the method shown in FIG. 8 in that the ads are selected using the separate user input device 112 while content continues to be displayed on the display 122. The user may use the user input device to select ads, change their order in the ad queue, or delete ads at any time, without affecting the content display.

As shown in the display additional ads step 1416, the system 100 selects additional ads to display if there are insufficient ads in the ad queue to fill the entire ad display duration. The additional ads may be selected using various criteria and available data, for example, saved user ad category preferences, type of video content, the user profile, and other metadata. Skilled artisans will note that various modules and components of the systems 100 shown in FIGS. 1-4 may be used to select the additional ads.

Figure 11:
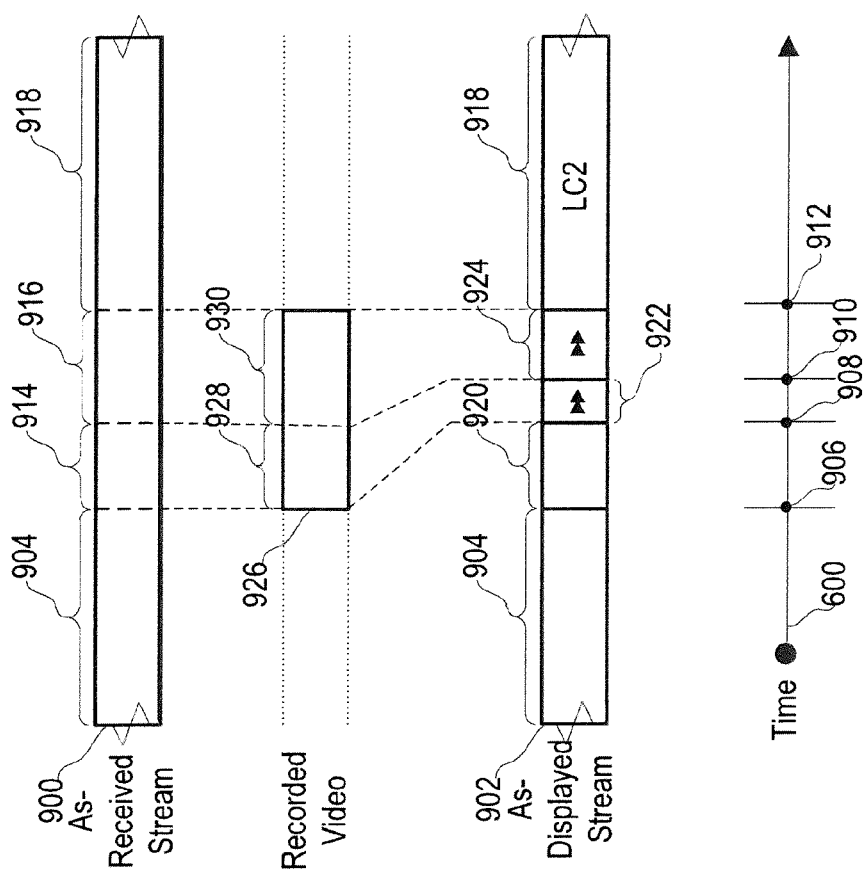
FIG. 11 is a schematic diagram of a method of recording and displaying of content during a live video event.

Referring next to FIG. 11, a schematic diagram of a method of recording and displaying of content during a live video event is shown. Shown are a timeline 600, an as-received stream 900, an as-displayed stream 902, a first live content 904, an ad block start time 906, an ad block end time 908, an ad block missed content end time 910, a return to live content time 912, an ad block missed live content 914, an additional missed live content 916, a second live content 918, an ad block 920, a fast-forwarded ad block missed content 922, a fast-forwarded additional missed content 924, a recorded video 926, a recorded ad block missed content 928, and a recorded additional missed content 930.

The as-received stream 900 is schematically depicted as a continuous linear temporal pipeline in which video content 110 is received by the viewing device 120 over time. A portion of time of the as-received stream 900 is depicted. For the temporal period shown, the as-received stream 900 comprises the live video event. Four segments in the as-received stream 900 are delineated.

The earliest time segment shown in the as-received stream 900 is the first live content 904 segment. The start of the first live content 904 segment is the earliest time shown on the temporal pipeline depicted in FIG. 11. The end of the first live content 904 segment is the ad block start time 906. The first live content 904 segment comprises the live content as received by the viewing device 120 in real-time.

The next time segment shown is the ad block missed live content 914 segment. The start of the ad block missed live content 914 segment is defined by the ad block start time 906. The end of the ad block missed live content 914 segment is defined by the ad block end time 908. The ad block missed live content 914 segment comprises a time segment of the live content as received by the viewing device 120 in real-time.

The third time segment shown is the additional missed live content 916 segment. The start of the additional missed live content 916 segment is defined by the ad block missed content end time 910, and the end of the additional missed live content 916 segment is defined by the return to live content time 912. The additional missed live content 916 segment comprises a time segment of the live content as received by the viewing device 120 in real-time.

The last time segment shown in the as-received stream 900 is the second live content 918 segment. The start of the second live content 918 segment is defined by the return to content time 912 and the end of the second live content 918 stream is defined by the latest time depicted by the portion of time shown in FIG. 11. The second live content 918 segment comprises a time segment of the live content as received by the viewing device 120 in real-time.

The as-displayed stream 902 is also depicted as a continuous linear temporal pipeline in which video is displayed by the viewing device 120. The temporal portion shown corresponds to the temporal portion of the as-received stream 900. Five segments are delineated in the as-displayed stream: the first live content 904 segment, the ad block 920 segment, the fast-forwarded ad block missed content 922 segment, the fast-forwarded additional missed content 294 segment, and the second live content 918 segment.

The first segment in time shown is the first live content 904 segment. The start of the first live content 904 segment is defined as the earliest time shown on the depicted portion of the as-displayed stream. The end of the first live content 904 segment is defined as the ad block start time 906. The first live content 904 segment includes the live content event as received from the video content provider 102.

The next segment in time is the ad block 920 segment. The start of the ad block 920 segment is defined as the ad block start time 906, and the end of the ad block 920 segment is defined as the ad block end time 908. The ad block 920 segment comprises video advertisements displayed on the viewing device 120.

The following time segment is the fast-forwarded ad block missed content 922 segment. The start of the fast-forwarded ad block missed content 922 segment is defined as the ad block end time 908. The end of the fast-forwarded ad block missed content 922 segment is defined as the ad block missed content end time 910. The fast-forwarded ad block missed content 922 segment comprises the live content recorded and played in a compressed fashion by the viewing device 120 (as explained further below).

The fast-forwarded additional recorded content segment follows the fast-forwarded recorded missed content segment. The start of the fast-forwarded additional missed content 924 segment is defined as the ad block missed content end time 910. The end of the fast-forwarded additional missed content 924 segment is defined as the return to live content time 912. The fast-forwarded additional missed content 924 segment comprises the live content recorded and played in a compressed fashion by the viewing device 120 (as explained further below).

The last as-displayed time segment shown is the second live content 918 segment. The start of the second live content 918 segment is defined by the return to live content time 912 and the end of the second live content 918 stream is defined by the latest time depicted by the portion of time shown in FIG. 11. The second live content 918 segment comprises the live content as received by the viewing device 120 in real-time.

Also shown in FIG. 11 is the recorded video 926. The recorded video 926 comprises the live content that has been recorded by the viewing device 120 and is available for playback by the viewing device 120. In another embodiment of the invention, the live content may be recorded by the content and schedule provider 102, the video content and schedule provider 200, video provider 300, or other head-end component of the system 100. The recorded video 926 would then be transmitted to the viewing device 120. The exemplary recorded video 926 comprises two time segments: the recorded ad block missed content 928 and the recorded additional missed content 930.

The earlier time segment of the recorded video 926 is the recorded ad block missed content 928. The start time of the recorded ad block missed content 928 is the ad block start time 906 and the end time of the recorded ad block missed content 928 is the ad block end time 908. The recorded ad block missed content 928 comprises a recording of the live content received by the viewing device 120 during that time period.

The second time segment of the recorded video 926 is the recorded additional missed content 930. The start time of the recorded additional missed content 930 is the ad block end time 908 and the end time of the recorded additional missed content 930 is the return to live content time 912. The recorded additional missed content 930 comprises a recording of the live content received by the viewing device 120 during that time period.

Referring again to FIG. 11, portions of two main content streams are shown: the as-received stream 900 and the as-displayed stream 902. The as-displayed stream 902 is comprised of three main components: live content watched in real-time, video advertisements, and live content that has been recorded and re-played.

Both portions of the content streams 900, 902 are shown beginning with a real-time live content stream, the first live content 904. The first live content 904 is received by the viewing device 120 and displayed on the viewing device 120 in real-time.

When the advertising block 920 is displayed on the viewing device 120, the first live content 904 is no longer displayed on the viewing device 120. The time period of the advertising block 920 is delineated by the ad block start time 906 and the ad block end time 908. During the advertising block 920 time period, the as-received stream 900 contains the ad block missed live content 914, which is the live content that is not viewed on the viewing device 120 due to the display of the video advertisements, and thus is missed by the viewer.

The recorded ad block missed content 928 segment in the recorded video 926 also corresponds to the ad block time period, and depicts the ad block missed live content 914 as recorded by the viewing device 120 but not yet viewed.

When the ad block 920 segment ends at the ad block end time 908, the viewing device display 122 plays the recorded ad block missed content 928 on the viewing device 120. In this example, in order for the viewer to return to live content, the viewer fast-forwards through the recorded content. This is shown on the as-displayed stream 902 as the fast-forwarded ad block missed content 922 segment. The content may be fast-forwarded at various speeds as determined by the receiving module 114, for example twice as fast as real-time, four times as fast or 8 times as fast. Alternately, at higher fast-forwarding speeds the display could show a series of still video frames. The fast-forwarding of the fast-forwarded ad block missed content 922 is depicted on the diagram as a shorter time period than the corresponding recorded ad block missed content 928.

In the exemplary viewing diagram shown, while the viewing device 120 is displaying the fast-forwarded ad block missed content 922, the live content stream remains unviewed by the viewer, as denoted by the additional missed live content 916 shown in the as-received stream 900. The additional missed live content 916 is recorded by the viewing device 120, as shown in the recorded video 926 by the recorded additional missed content 930. The recorded additional missed content 930 is recorded until the recorded content time catches up to the live content time, at which point the recording terminates and the live content display on the viewing device 120 resumes.

In order to catch up to the live content, the recorded additional missed content 930 may also be fast-forwarded. This is shown in the as-displayed stream 902 by the fast-forwarded additional missed content 924, which corresponds to the recorded additional missed content 930. The fast-forwarded additional missed content 924 may be fast-forwarded at various speeds as determined by the receiving module 114, for example twice as fast as real-time, four times as fast or 8 times as fast. Alternately, at higher fast-forwarding speeds the display 122 could show a series of still video frames. The fast-forwarding of the fast-forwarded additional missed content 924 is depicted on the diagram as a shorter time period than the corresponding recorded additional missed content 930.

The resulting display allows the video advertisements to be shown in their entirety, without fast-forwarding, while still allowing the viewer to view the live content missed while the ad block 920 is displayed.

Those of ordinary skill in the art will note that the viewer may toggle between normal time viewing of the recorded content and fast-forwarding, depending on the viewer's interest in the content. The viewer may also perform other trick playing of the recorded content on the viewing device 120, such as rewind and replay, as supported by the viewing device 120.

Figure 12:
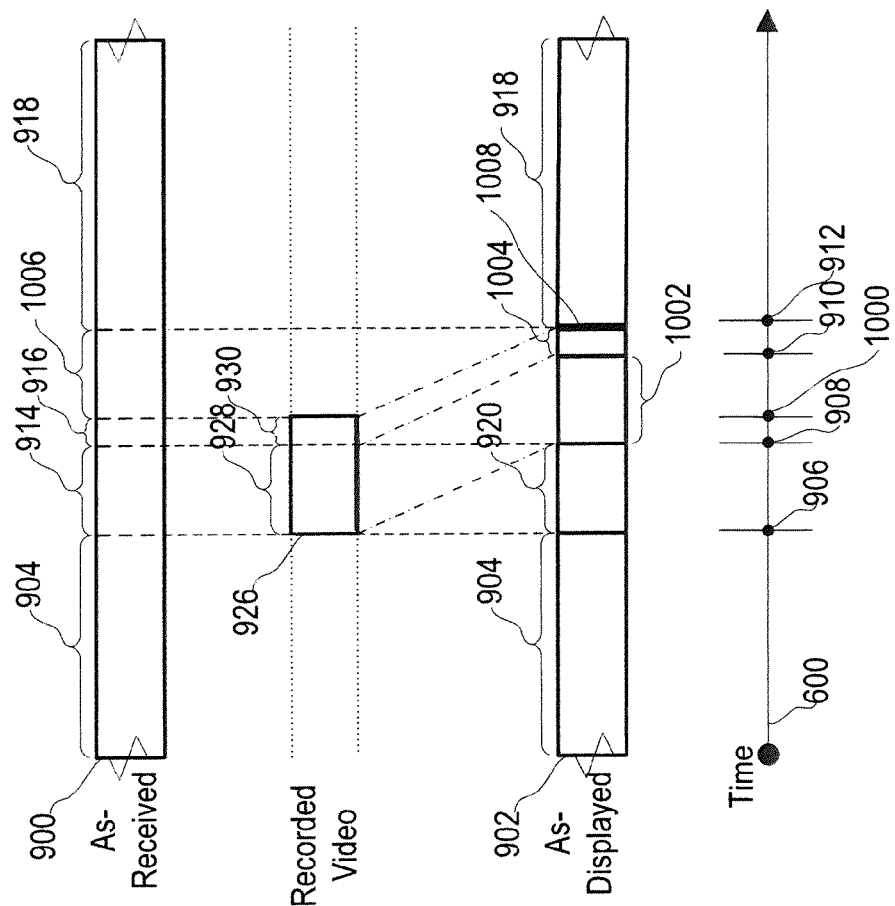
FIG. 12 is a a schematic diagram showing a further embodiment of recording of live content during a live video event.

Referring next to FIG. 12, a schematic diagram showing an alternate embodiment of recording of live content during the live video event is shown. In the embodiment shown, the recorded segments are not fast-forwarded. Shown are the timeline 600, the as-received stream 900, the as-displayed stream 902, the first live content 904, the second live content 918, the ad block start time 906, the ad block end time 908, an end of recording time 1000, the ad block missed content end time 910, the return to live content time 912, the second live content 918, the ad block 920, a played ad block missed content 1002, a played additional missed content 1004, the ad block missed live content 914, the additional missed live content 916, an unwatched live content 1006, the recorded video 926, the recorded ad block missed content 928, the recorded additional missed content 930, and a skip event 1008.

As in FIG. 11, the as-received stream 900 and the as-displayed stream are depicted as continuous linear temporal pipelines.

Five segments of the as-received stream 900 are depicted. The earliest time segment shown in the as-received stream 900 is the first live content 904 segment. The start of the first live content 904 segment is the earliest time shown on the timeline 600 in FIG. 10. The end of the first live content 904 segment is the ad block start time 906. The first live content 904 segment comprises the live content as received by the viewing device 120 in real-time.

The second time segment shown in the as-received stream 900 is the ad block missed live content 914 segment. The start of the ad block missed live content 914 segment is defined by the ad block start time 906. The end of the ad block missed live content 914 segment is defined by the ad block end time 908. The ad block missed live content 914 segment comprises a time segment of the live content as received by the viewing device 120 in real-time.

The third time segment shown is the additional missed live content 916 segment. The start of the additional missed live content 916 segment is defined by the ad block end time 908, and the end of the additional missed live content 916 segment is defined by the end of recording time 1000. The additional missed live content 916 segment comprises a time segment of the live content as received by the viewing device 120 in real-time.

The fourth time segment shown in the as-received stream 900 is the unwatched live content 1006 segment. The start of the unwatched live content 1006 segment is defined by the end of recording time 1000, and the end of the unwatched live content 1006 segment is defined as the return to live content time 912. The unwatched live content 1006 segment comprises a time segment of the live content as received by the viewing device 120 in real-time.

The last time segment shown in the received content stream is the second live content 918 segment. The start of the second live content 918 segment is defined by the return to live content time 912 and the end of the second live content 918 stream is defined by the latest time depicted by the temporal pipeline shown in FIG. 12. The second live content 918 segment comprises a time segment of the live content as received by the viewing device 120 in real-time.

The as-displayed stream 902 is also depicted as a continuous linear temporal pipeline in which video is displayed by the viewing device 120. The temporal portion shown corresponds to the temporal portion of the as-received stream 900. Five segments are delineated in the as-displayed stream: the first live content 904 segment, the ad block 920 segment, the played ad block missed content 1002, the played additional missed content 1004, and the second live content 918 segment.

The first segment in time shown is the first live content 904 segment. The start of the first live content 904 segment is defined as the earliest time shown on the depicted portion of the as-displayed stream 902. The end of the first live content 904 segment is defined as the ad block start time 906. The first live content 904 segment includes the live content event as received.

The next segment in time is the ad block 920 segment. The start of the ad block 920 segment is defined as the ad block start time 906, and the end of the ad block 920 segment is defined as the ad block end time 908. The ad block 920 segment comprises video advertisements displayed on the viewing device 120.

The following time segment is the played ad block missed content 1002 segment. The start of the played ad block missed content 1002 segment is defined as the ad block end time 908. The end of the played ad block missed content 1002 segment is defined as the end of ad block missed content end time 910. The played ad block missed content 1002 segment comprises the live content recorded and played by the viewing device 120 (as explained further below).

The played additional missed content 1004 segment follows the played ad block missed content 1002 segment. The start of the played additional missed content 1004 segment is defined as the ad block missed content end time 910. The end of the played additional missed content 1004 segment is defined as the return to live content time 912. The played additional missed content 1004 segment comprises the live content recorded and played by the viewing device 120 (as explained further below).

The last as-displayed time segment shown is the second live content 918 segment. The start of the second live content 918 segment is defined by the return to live content time and the end of the second live content 918 stream is defined by the latest time depicted by the portion of time shown in FIG. 12. The second live content 918 segment comprises the live content as received by the viewing device 120 in real-time.

Also shown in FIG. 12 is the recorded video 926. The recorded video 926 comprises the live content that has been recorded by the viewing device 120 and is available for playback by the viewing device 120. As stated above in FIG. 11, alternately the recorded video 926 may be recorded by a head-end component of the system 100 and transmitted to the viewing device 120. The exemplary recorded video 926 comprises two time segments: the recorded ad block missed content 928 and the recorded additional missed content 930.

The earlier time segment of the recorded video 926 is the recorded ad block missed content 928. The start time of the recorded ad block missed content 928 is the ad block start time 906 and the end time of the recorded ad block missed content 928 is the ad block end time 908. The recorded ad block missed content 928 comprises a recording of the live content received by the viewing device 120 during that time period.

The second time segment of the recorded video 926 is the recorded additional missed content 930. The start time of the recorded additional missed content 930 is the ad block end time 908 and the end time of the recorded additional missed content 930 is the end of recording time 1000. The end of recording time 1000 is later than the ad block end time 908, but earlier than the return to live content time 912. The recorded additional missed content 930 comprises a recording of the live content received by the viewing device 120 during that time period.

Referring again to FIG. 10, temporal portions of two main content streams are shown: the as-received stream 900 and the as-displayed stream 902. The as-displayed stream 902 is comprised of three main components: live content watched in real-time, video advertisements, and live content that has been recorded and re-played.

Both portions of the content streams 900, 902 are shown beginning with a real-time live content stream, the first live content 904. The first live content 904 is received by the viewing device 120 and displayed on the viewing device 120 in real-time.

When the advertising block 920 is displayed on the viewing device 120, the first live content 904 is no longer displayed on the viewing device 120. The time period of the advertising block 920 is delineated by the ad block start time 906 and the ad block end time 908. During the advertising block 920 time period, the as-received stream 900 contains the ad block missed live content 914, which is the live content that is not viewed on the viewing device 120 due to the display of the video advertisements, and thus is missed by the viewer.

The recorded ad block missed content 928 segment in the recorded video 926 also corresponds to the ad block 920 time period, and depicts the ad block missed live content 914 as recorded by the viewing device 120 but not yet viewed.

When the ad block 920 segment ends at the ad block end time 908, the viewing device display 122 plays the recorded ad block missed content 928 on the viewing device 120. In this embodiment, the recorded content is played as-is, i.e. with no fast-forwarding.

While the viewing device 120 is displaying the played ad block missed content 1002, the viewing device 120 continues to record the live content not currently viewed. The recorded content after the ad block time has ended, but live content has not yet resumed, is the recorded additional missed content 930.

After the viewing device 120 has displayed the recorded ad block missed content 928 as the played ad block missed content 1002, the viewing device 120 displays the recorded additional missed content 930 as the played additional missed content 1004. The viewing device 120 displays the played additional missed content 1004 until the viewer enters the skip command 614 to the viewing device 120, denoted as the skip event 1008. The skip event 1008 occurs at the end of the played additional missed content 1004. At the skip command 614, the viewing device 120 ceases to record the live content, and the viewing device 120 returns to displaying live content.

Because the viewing device 120 was displaying recorded content, when the skip command 614 is entered and the viewing device 120 returns to display of the live content, a portion of the recorded live content remains unviewed. This segment is depicted by the unwatched live content 1006 segment on the as-received stream 900.

This embodiment of the invention provides an alternate viewing experience if the viewer chooses to watch a portion of the missed content in real-time, instead of fast-forwarding through part or all of the content.

Figure 13:
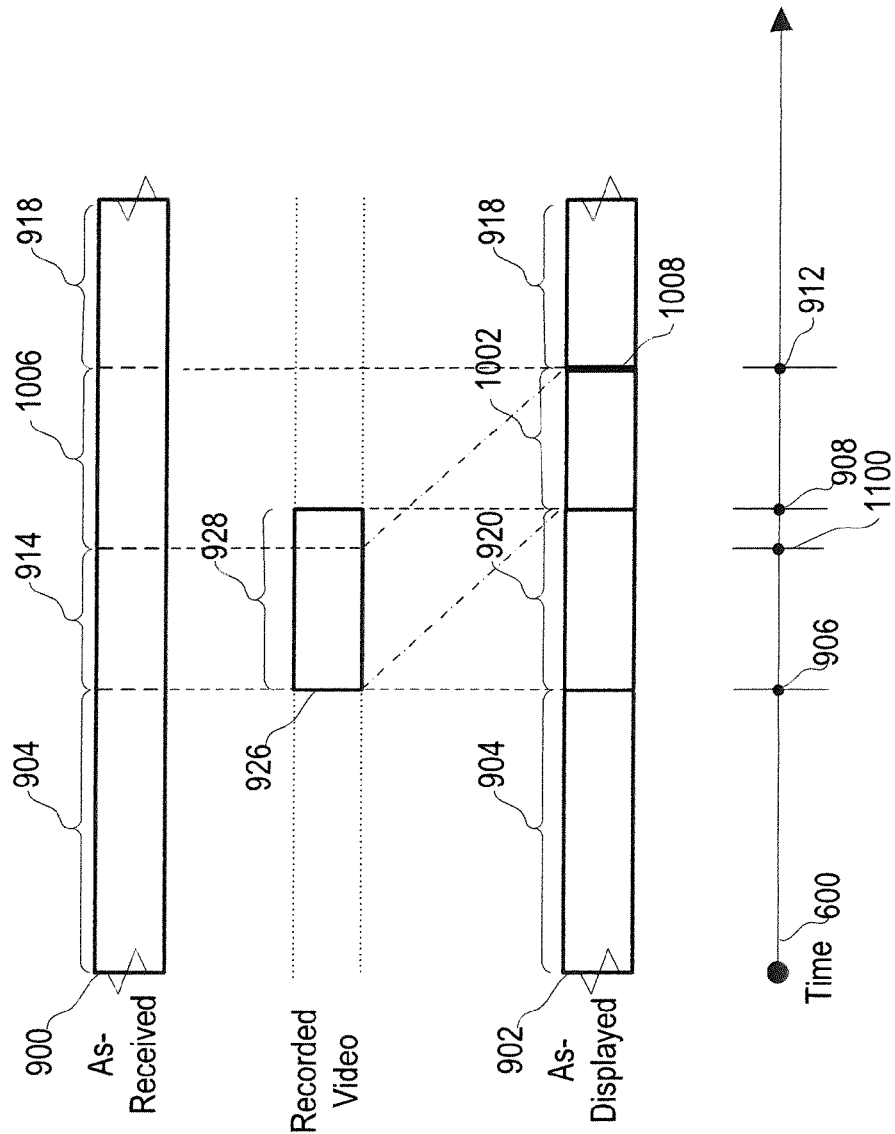
FIG. 13 is a schematic diagram showing a further embodiment of recording of live content during a live video event.

Referring next to FIG. 13, a pictorial diagram showing an alternate embodiment of recording of live content during a live video event is shown. Shown are the timeline 600, the as-received stream 900, the as-displayed stream 902, the first live content 904, the second live content 918, the ad block start time 906, the ad block end time 908, an end of displayed recorded content time 1100, the return to live content time 912, the second live content 918, the ad block 920, the played ad block missed content 1002, the unwatched live content 1006, the played ad block missed content 1002, the recorded video 926, the recorded ad block missed content 928, and the skip event 1008.

As in FIGS. 11 and 12, the as-received stream 900 and the as-displayed stream 902 are depicted as continuous linear temporal pipelines.

Four segments of the as-received stream 900 are depicted. The earliest time segment shown in the as-received stream 900 is the first live content 904 segment. The start of the first live content 904 segment is the earliest time shown on the timeline 600 in FIG. 11. The end of the first live content 904 segment is the ad block start time 906. The first live content 904 segment comprises the live content as received by the viewing device 120 in real-time.

The second time segment shown in the as-received stream 900 is the ad block missed live content 914 segment. The start of the ad block missed live content 914 segment is defined by the ad block start time 906. The end of the ad block missed live content 914 segment is defined by the end of displayed recorded content time 1100. The end of displayed recorded content time 1100 occurs at an earlier time than the ad block end time 908. The ad block missed live content 914 segment comprises a time segment of the live content as received by the viewing device 120 in real-time.

The third time segment shown in the as-received stream 900 is the unwatched live content 1006 segment. The start of the unwatched live content 1006 segment is defined by the end of the displayed recorded content time 1100, and the end of the unwatched live content 1006 segment is defined as the return to live content time 912. The ad block end time 908 occurs during the unwatched live content 1006 segment. The unwatched live content 1006 segment comprises a time segment of the live content as received by the viewing device 120 in real-time.

The last time segment shown in the received content stream is the second live content 918 segment. The start of the second live content 918 segment is defined by the return to live content time 912 and the end of the second live content 918 stream is defined by the latest time depicted by the temporal pipeline shown in FIG. 13. The second live content 918 segment comprises a time segment of the live content as received by the viewing device 120 in real-time.

The as-displayed stream 902 is also depicted as a continuous linear temporal pipeline in which video is displayed by the viewing device 120. The temporal portion shown corresponds to the temporal portion of the as-received stream 900. Four segments are delineated in the as-displayed stream 902: the first live content 904 segment, the ad block 920 segment, the played ad block missed content 1002, and the second live content 918 segment.

The first segment in time shown is the first live content 904 segment. The start of the first live content 904 segment is defined as the earliest time shown on the depicted portion of the as-displayed stream. The end of the first live content 904 segment is defined as the ad block start time 906. The first live content 904 segment includes the live content event as received.

The next segment in time is the ad block 920 segment. The start of the ad block 920 segment is defined as the ad block start time 906, and the end of the ad block 920 segment is defined as the ad block end time 908. The ad block 920 segment comprises video advertisements displayed on the viewing device 120.

The third time segment is the played ad block missed content 1002 segment. The start of the played ad block missed content 1002 segment is defined as the ad block end time 908. The end of the played ad block missed content 1002 segment is defined as the return to live content time 912. The played ad block missed content 1002 segment comprises a portion of the live content recorded and played by the viewing device 120 (as explained further below).

The last as-displayed time segment shown is the second live content 918 segment. The start of the second live content 918 segment is defined by the return to live content time 912 and the end of the second live content 918 stream is defined by the latest time depicted by the portion of time shown in FIG. 13. The second live content 918 segment comprises the live content as received by the viewing device 120 in real-time.

Also shown in FIG. 13 is the recorded video 926. The recorded video 926 comprises the live content that has been recorded by the viewing device 120 and is available for playback by the viewing device 120. As stated above in FIG. 11, alternately the recorded video 926 may be recorded by a head-end component of the system 100 and transmitted to the viewing device 120. The exemplary recorded video 926 comprises the recorded ad block missed content 928.

The time segment of the recorded video 926 is the recorded ad block missed content 928. The start time of the recorded ad block missed content 928 is the ad block start time 906 and the end time of the recorded ad block missed content 928 is the ad block end time 908. The recorded ad block missed content 928 comprises a recording of the live content received by the viewing device 120 during that time period.

Referring again to FIG. 13, temporal portions of two main content streams are shown: the as-received stream 900 and the as-displayed stream 902. The as-displayed stream 902 is comprised of three main components: live content watched in real-time, video advertisements, and live content that has been recorded and re-played.

Both portions of the content streams are shown beginning with a real-time live content stream, the first live content 904. The first live content 904 is received by the viewing device 120 and displayed on the viewing device 120 in real-time.

When the advertising block 920 is displayed on the viewing device 120, the live content is no longer displayed on the viewing device 120. The time period of the advertising block 920 is delineated by the ad block start time 906 and the ad block end time 908. During the advertising block 920 time period, the as-received stream 900 contains the ad block missed live content 914, which is the live content that is not viewed on the viewing device 120 due to the display of the video advertisements, and thus is missed by the viewer.

The recorded ad block missed content 928 segment in the recorded video 926 also corresponds to the ad block 920 time period, and depicts the ad block missed live content 914 as recorded by the viewing device 120 but not yet viewed.

When the ad block 920 segment ends at the ad block end time 908, the viewing device display 122 plays the recorded ad block missed content 928 on the viewing device 120. In this embodiment, the recorded content 928 is played as-is, i.e. with no fast-forwarding.

As shown in FIG. 13, in this embodiment the viewer has chosen to watch a portion, but not all, of the recorded ad block missed content 928. While the recorded ad block missed content 928 is being displayed on the viewing device 120, the viewer inputs a skip command 614 at the return to live content time 912, which ends display of the recorded video 926 and returns the display to the live content. The user input 622 is denoted as the skip event 1008 on the as-displayed stream, and occurs at the return to live content time 912. The remainder of the recorded ad block missed content 928 is skipped and the display 122 returns to the live content.

The as-received segment unwatched live content 1006 comprises the unwatched portion of the ad block missed live content 914, as described above, and the additional unwatched live content 1006 that occurred while the viewer was watching a portion of the recorded ad block missed content 928.

This embodiment of the invention differs from FIG. 8 in that the viewer returns to live content viewing prior to playing of the entire portion of content missed when the ad block 920 is displayed. The skilled artisan will note that the viewer may also choose to skip the entire recorded ad block missed content 928; i.e. the skip event 1008 occurs at the ad block end time 908, which is coincidental with the return to live content time 912. The unwatched live content 1006 would then comprise the recorded ad block missed content 928.

Figure 14:
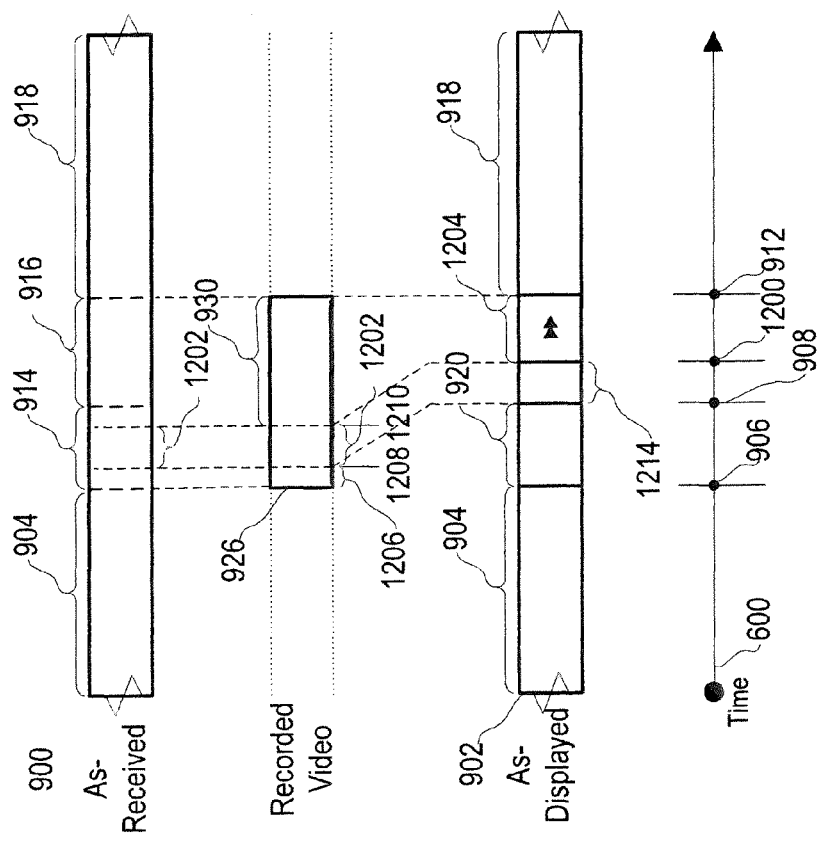
FIG. 14 is a schematic diagram showing a further embodiment of recording of live content during a live video event.

Referring next to FIG. 14, a pictorial diagram showing an alternate embodiment of recording of live content during the live video event is shown. Shown are the timeline 600, the as-received stream 900, the as-displayed stream 902, the first live content 904, the second live content 918, the ad block start time 906, the ad block end time 908, an end of provider-determined content time 1200, the return to live content time 912, the ad block 920, the ad block missed live content 914, the additional missed live content 916, a provider-determined missed content 1202, a fast-forwarded recorded content 1204, the recorded video 926, an unwatched recorded content 1206, the recorded additional missed content 930, a first time 1208, a second time 1210, and the skip event 1008, a recorded provider-determined missed content 1212, and a played provider-determied missed content 1214.

As in FIGS. 11-13, the as-received stream 900 and the as-displayed stream 902 are depicted as continuous linear temporal pipelines.

Five segments of the as-received stream 900 are depicted. The earliest time segment shown in the as-received stream 900 is the first live content 904 segment. The start of the first live content 904 segment is the earliest time shown on the timeline 600 in FIG. 12. The end of the first live content 904 segment is the ad block start time 906. The first live content 904 segment comprises the live content as received by the viewing device 120 in real-time.

The second time segment shown in the as-received stream 900 is the ad block missed live content 914 segment. The start of the ad block missed live content 914 segment is defined by the ad block start time 906. The end of the ad block missed live content 914 segment is defined by the ad block end time 908. The ad block missed live content 914 segment comprises a time segment of the live content as received by the viewing device 120 in real-time.

The third time segment shown in the as-received stream 900 is the provider-determined missed content 1202. The provider-determined missed content 1202 is a sub-segment of the ad block missed live content 914 segment. The provider-determined missed content 1202 segment starts at the first time 1208, where the first time 1208 is between the ad block start time 906 and the ad block end time 908. The provider-determined missed content 1202 ends at the second time 1210, where the second time 1210 is a time later than the first time 1208, but earlier than the ad block end time 908.

The fourth time segment shown in the as-received stream 900 is the additional missed live content 916 segment. The start of the additional missed live content 916 segment is defined by the ad block end time 908, and the end of the additional missed content segment is defined as the return to live content time 912. The additional missed live content 916 segment comprises a time segment of the live content as received by the viewing device 120 in real-time.

The last time segment shown in the as-received stream 900 is the second live content 918 segment. The start of the second live content 918 segment is defined by the return to live content time 912 and the end of the second live content 918 stream is defined by the latest time depicted by the temporal segment shown in FIG. 14. The second live content 918 segment comprises a time segment of the live content as received by the viewing device 120 in real-time.

The as-displayed stream 902 is also depicted as a continuous linear temporal pipeline in which video is displayed by the viewing device 120. The temporal portion shown corresponds to the temporal portion of the as-received stream 900. Five segments are delineated in the as-displayed stream: the first live content 904 segment, the ad block 920 segment, the provider-determined missed content 1202, the fast-forwarded recorded content 1204, and the second live content 918 segment.

The first segment in time shown is the first live content 904 segment. The start of the first live content 904 segment is defined as the earliest time shown on the depicted portion of the as-displayed stream 902. The end of the first live content 904 segment is defined as the ad block start time 906. The first live content 904 segment includes the live content event as received.

The next segment in time is the ad block 920 segment. The start of the ad block 920 segment is defined as the ad block start time 906, and the end of the ad block 920 segment is defined as the ad block end time 908. The ad block 920 segment comprises video advertisements displayed on the viewing device 120.

The third time segment is the provider-determined missed content 1202 segment. The start of the provider-determined missed content 1202 segment is defined as the ad block end time 908. The end of the played ad block 920 missed content segment is defined as the end of provider-determined content time 1200. The played ad block missed content 1002 segment comprises a portion of the live content recorded and played by the viewing device 120 (as explained further below).

The fourth as-displayed time segment shown is the fast-forwarded recorded content 1204 segment. The start of the fast-forwarded recorded content 1204 segment is defined as the end of provider-determined content time 1200. The end of the fast-forwarded recorded content 1204 segment is defined as the return to live content time 912. The fast-forwarded recorded content 1204 segment comprises a portion of live content recorded and played in a compressed fashion by the viewing device 120 (as explained further below).

The last as-displayed time segment shown is the second live content 918 segment. The start of the second live content 918 segment is defined by the return to live content time 912 and the end of the second live content 918 stream is defined by the latest time depicted by the portion of time shown in FIG. 14. The second live content 918 segment comprises the live content as received by the viewing device 120 in real-time.

Also shown in FIG. 14 is the recorded video 926. The recorded video 926 comprises the live content that has been recorded by the viewing device 120 and is available for playback by the viewing device 120. As stated above in FIG. 11, alternately the recorded video 926 may be recorded by a head-end component of the system 100 and transmitted to the viewing device 120. The exemplary recorded video 926 comprises the unwatched recorded content 1206 segment, the recorded provider-determined missed content 1202 segment, and the recorded additional missed content 930.

The first time segment of the recorded video 926 is the unwatched recorded content 1206. The start time of the unwatched recorded content 1206 is the ad block start time 906. The end time of the unwatched recorded content 1206 is the first time 1208 and occurs during the as-displayed ad block 920 time segment. The recorded ad block missed content 928 comprises a recording of the live content received by the viewing device 120 during that time period.

The second time segment of the recorded video 926 is the recorded provider-determined missed content 1212. The start time of the recorded provider-determined missed content 1212 is the first time 1208. The end time of the recorded provider-determined missed content 1212 is the second time 1210 and occurs during the as-displayed ad block 920 time segment. The recorded provider-determined missed content 1212 segment comprises a recording of the live content received by the viewing device 120 during that time period.

The third and last time segment of the recorded video 926 is the recorded additional missed content 930 segment. The start time of the recorded additional missed content 930 segment is the second time 1210, and the end time of the recorded additional missed content 930 is the return to live content time 912. The recorded additional missed content 930 comprises a recording of the live content received by the viewing device 120 during that time period.

Referring again to FIG. 14, temporal portions of two main content streams are shown: the as-received stream 900 and the as-displayed stream 902. The as-displayed stream 902 is comprised of three main components: live content watched in real-time, video advertisements, and live content that has been recorded and re-played.

Both portions of the content streams are shown beginning with a real-time live content stream, the first live content 904. The first live content 904 is received by the viewing device 120 and displayed on the viewing device 120 in real-time.

When the advertising block 920 is displayed on the viewing device 120, the live content is no longer displayed on the viewing device 120. The time period of the advertising block 920 is delineated by the ad block start time 906 and the ad block end time 908. During the advertising block 920 time period, the as-received stream 900 contains the ad block missed live content 914, which is the live content that is not viewed on the viewing device 120 due to the display of the video advertisements, and thus is missed by the viewer.

If the content provider 102 determines that a portion of the ad block missed live content 914 is of special interest to the viewer, the content provider 102 may transmit the first time 1208 and the second time 1210 to the viewing device 120, with the instructions that the resulting provider-determined missed content 1202 time segment between the first time 1208 and the second time 1210 be displayed on the viewing device 120 at the end of the ad block 920. The played provider-determined missed content 1214 corresponds to the as-received provider-determined missed content 1202 and the recorded provider-determined missed content 1212.

When the ad block end time 908 is reached, the recorded provider-determined missed content 1212 is displayed in real time on the viewing device 120 as the played provider-determined missed content 1214. When the second time is reached, the recorded additional missed content 930 is displayed on the viewing device 120 as the fast-forwarded recorded content 1204. The fast-forwarded recorded content 1204 is then played at an increased speed (such as 2×, 4× or 8×), so that the viewer may catch up to the live content. When the viewer has displayed all of the recorded content, the display returns to the live content and the recording ceases.

The skilled artisan will note that instead of fast-forwarding, the viewer may skip the recorded additional missed content 930, as shown above in FIG. 14. Alternately, a combination of fast-forwarding and skipping may be used to catch up to the live content.

The provider-determined content allows the provider to display specific content that otherwise may not be viewed due to the display of advertisements. For example, during a baseball game live event, the provider defines a provider-determined segment as the duration of a home run. If the viewer has chosen to watch an ad block 920 during the home run segment, after the ad block 920 is finished the home run segment will automatically be viewed on the viewing device 120.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. An internet protocol video viewing device for displaying video advertisements during a live internet protocol video content stream comprising:
    a transmitting module configured for connection to a communication channel,
    a receiving module configured for connection to the communication channel, wherein an internet protocol video content, an internet protocol ad content, a plurality of ad insertion times and a plurality of ad display durations are received,
    an evaluation module communicatively coupled to the transmitting module and to the receiving module, and comprising a submodule configured for receiving and evaluating the plurality of ad insertion times and the plurality of ad display durations,
    a display communicatively coupled to the receiving module and configured to display video content received from the receiving module, and
    a storage device communicatively coupled to the receiving module.

2. The internet protocol viewing device of claim 1, further comprising:
    a user input device communicatively coupled to the internet protocol video viewing device.

3. The internet protocol viewing device of claim 1, further comprising:
    a content-related data configured for connection to the communication channel, and includes data in relation to the internet protocol video content.

4. The internet protocol viewing device of claim 1, further comprising:
   a user data configured for connection to the communication channel, wherein the user data includes data in relation to a user.

5. A method for displaying video advertisements during an internet protocol video content stream comprising:
   receiving of the internet protocol video content stream by an internet protocol video viewing device;
   receiving of an internet protocol ad content by the internet protocol video viewing device;
   receiving of an internet protocol ad schedule by the internet protocol video viewing device, wherein the internet protocol ad schedule includes a plurality of ad insertion times and a plurality of ad display durations, wherein each of the plurality of ad insertion times corresponds to one of the plurality of ad display durations, wherein each of the plurality of ad insertion times indicates a start time for ad content display during the viewing of the internet protocol video content stream, wherein each of the plurality of ad display durations determines a duration of time for ad content display, wherein the plurality of ad insertion times includes a first ad insertion time, wherein the plurality of ad display durations includes a first ad display duration, and wherein the first ad insertion time corresponds to the first ad display duration;
   displaying the internet protocol video content stream on the internet protocol video viewing device;
   pausing the display of the internet protocol video content stream on the internet protocol video viewing device when the first ad insertion time is reached;
   commencing the display of the internet protocol ad content;
   ceasing the display of the internet protocol ad content when the first ad display duration is reached; and
   resuming display of the internet protocol video content stream on the internet protocol video viewing device.

6. The method for displaying video advertisements during the internet protocol video content stream according to claim 5, further comprising:
   receiving an updated internet protocol ad schedule.

7. The method for displaying video advertisements during the internet protocol video content stream according to claim 5, wherein the internet protocol ad content is selected as a function of an ad selection criteria.

8. The method for displaying video advertisements during the internet protocol video content stream according to claim 7, wherein the internet protocol video viewing device includes an evaluation module, wherein the evaluation module is configured for selecting the internet protocol ad content based on the ad selection criteria.

9. The method for displaying video advertisements during the internet protocol video content stream according to claim 7, wherein at least a portion of the ad selection criteria is received through a user input device.

10. The method for displaying video advertisements during the internet protocol video content stream according to claim 5, wherein the internet protocol video viewing device is configured for recording internet protocol video content, and configured for replaying the internet protocol video content.

11. The method for displaying video advertisements during the internet protocol video content stream according to claim 10, wherein the internet protocol video viewing device is configured for replaying recorded video content at a frame speed greater than or equal to the frame speed of the recorded video content.

12. The method for displaying video advertisements during the internet protocol video content stream according to claim 5, further comprising:
   recording a length of time that the internet protocol ad content is displayed on the internet protocol video viewing device.

13. A method for skipping display of an internet protocol ad content during an internet protocol video content stream comprising:
   receiving of the internet protocol video content stream by an internet protocol video viewing device;
   receiving of the internet protocol ad content by the internet protocol video viewing device;
   receiving of an internet protocol ad schedule by the internet protocol video viewing device, wherein the internet protocol ad schedule includes a plurality of ad insertion times and a plurality of ad display durations, wherein each of the plurality of ad insertion times corresponds to one of the plurality of ad display durations, and wherein each of the plurality of ad insertion times indicates a start time for ad content display during the viewing of the internet protocol video content stream, wherein each of the plurality of ad display durations determines a duration of time for ad display, wherein the plurality of ad insertion times includes a first ad insertion time;
   displaying the internet protocol video content stream on the internet protocol video viewing device;
   pausing the display of the internet protocol video content stream on the internet protocol video viewing device when the first ad insertion time is reached;
   commencing the display of the internet protocol ad content; and
   providing a user input to the internet protocol video viewing device, wherein the user input includes a skip command, whereby the display of the internet protocol ad content on the internet protocol video viewing device is discontinued.

14. The method for skipping display of the internet protocol ad content during an internet protocol video content stream according to claim 13, further comprising:
   determining a played advertisement time length, wherein the played advertisement time length is equal to a length of time the internet protocol ad content has been displayed before being discontinued.

15. The method for skipping display of the internet protocol ad content during an internet protocol video content stream according to claim 14, further comprising:
   providing a displayed advertisement time length,
      wherein the displayed advertisement time length is the length of time the internet protocol ad content has displayed on the internet protocol video viewing device during the internet protocol video content stream; and
   subtracting the played advertisement time length from the displayed advertisement time length.

16. A method for skipping display of an internet protocol ad content during an internet protocol video content stream comprising:
   receiving of the internet protocol video content stream by an internet protocol video viewing device;
   receiving of the internet protocol ad content by the internet protocol video viewing device, wherein the internet protocol ad content includes a first internet protocol ad and a second internet protocol ad,
   receiving of an internet protocol ad schedule by the internet protocol video viewing device, wherein the internet protocol ad schedule includes a plurality of ad insertion times and a plurality of ad display durations, wherein each of the plurality of ad insertion times corresponds to one of the plurality of ad display durations, wherein each of the plurality of ad insertion times indicates a start time for ad content display during the viewing of the internet protocol video content stream, wherein each of the plurality of ad display durations determines a duration of time for ad content display, wherein the plurality of ad insertion times includes a first ad insertion time;

displaying the internet protocol video content stream on the internet protocol video viewing device;

pausing the display of the internet protocol video content stream on the internet protocol video viewing device when the first ad insertion time is reached;

commencing the display of the first internet protocol ad;

providing a user input to the internet protocol video viewing device, wherein the user input includes a skip command, whereby the display of the first internet protocol ad on the internet protocol video viewing device is discontinued; and commencing the display of the second internet protocol ad on the internet protocol video viewing device.

17. The method for skipping display of the internet protocol ad content during an internet protocol video content stream according to claim 16 wherein the second internet protocol ad is selected as a function of an ad selection criteria.

18. The method for skipping display of the internet protocol ad content during an internet protocol video content stream according to claim 17 wherein at least a portion of the ad selection criteria is received through the user input.

19. A method for displaying video advertisements during an internet protocol video content stream comprising:

receiving a video content stream by an internet protocol video viewing device;

receiving an ad content;

receiving an ad insertion time indicating a start time to display ad content;

receiving an ad display duration indicating a duration of time to display ad content;

commencing the display of the video content stream on the internet protocol viewing device;

pausing the display of the video content stream when the ad insertion time is reached;

commencing the display of the ad content;

ceasing the display of the ad content when the ad display duration is reached; and resuming display of the video content stream.

* * * * *